United States Patent
Aziz et al.

(10) Patent No.: US 12,553,144 B2
(45) Date of Patent: Feb. 17, 2026

(54) METHOD OF MAKING SUPERCAPACITOR VIA ELECTRODEPOSITION

(71) Applicant: KING FAHD UNIVERSITY OF PETROLEUM AND MINERALS, Dhahran (SA)

(72) Inventors: Md. Abdul Aziz, Dhahran (SA); Wael Mahfoz, Dhahran (SA); Syed Shaheen Shah, Dhahran (SA); Abdulrahman Faisal Al-Betar, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 510 days.

(21) Appl. No.: 18/299,497

(22) Filed: Apr. 12, 2023

(65) Prior Publication Data
US 2024/0344227 A1    Oct. 17, 2024

(51) Int. Cl.
*C25D 9/02* (2006.01)
*C09D 5/44* (2006.01)
(Continued)

(52) U.S. Cl.
CPC ............... *C25D 9/02* (2013.01); *H01G 11/30* (2013.01); *H01G 11/84* (2013.01); *C09D 5/4476* (2013.01)

(58) Field of Classification Search
CPC .................................. C25D 9/02; C09D 5/4476
See application file for complete search history.

(56) References Cited

U.S. PATENT DOCUMENTS

2010/0008021 A1* 1/2010 Hu .................. H01M 4/583
427/79
2012/0182666 A1  7/2012 Kinlen et al.
(Continued)

FOREIGN PATENT DOCUMENTS

CN           109074967 B      7/2022
IN       464/MUM/2005        6/2007

OTHER PUBLICATIONS

Huang et al. ; Flexible and stretchable polyaniline supercapacitor with a high r ate capability ; Polymer International, vol. 70, Issue 4 ; Jan. 30, 2020 ; Abstract Only ; 4 Pages.
(Continued)

*Primary Examiner* — Brian W Cohen
(74) *Attorney, Agent, or Firm* — Oblon, McClelland, Maier & Neustadt, L.L.P.

(57) ABSTRACT

A method of making a supercapacitor including mixing aniline and an acid to form a solution, contacting a reference electrode, a counter electrode, and a steel substrate with the solution to form an electrodeposition system, applying a potential of from greater than 0 to about 2 volts (V) to the electrodeposition system, and depositing particles of polyaniline on a surface of the steel substrate to form a polyaniline electrode. The particles of the polyaniline have an oval sheet morphology with an average length of 100-300 nanometers (nm) and an average width of 50-150 nm. The method includes assembling two of the polyaniline electrodes in a symmetrical layered configuration with the surfaces having the particles of the polyaniline facing each other. An electrolyte is present between the two polyaniline electrodes to form the supercapacitor.

19 Claims, 27 Drawing Sheets

(51) Int. Cl.
*H01G 11/30* (2013.01)
*H01G 11/84* (2013.01)

(56) References Cited

U.S. PATENT DOCUMENTS

2017/0213657 A1 7/2017 Kaner et al.
2018/0309109 A1 10/2018 Kim et al.
2022/0005650 A1 1/2022 Alamro et al.

OTHER PUBLICATIONS

Qi et al. ; Polyaniline electrochemically deposited on tailored metal mesh for dynamically stretchable supercapacitors ; Australian Institute for Innovative Materials—Papers ; Jan. 1, 2019 ; 28 Pages.
Sowmya et al. ; Supercapacitor studies of electrochemically synthesized multi-layered polyaniline on stainless steel substrate ; Ionics ; Apr. 25, 2016 ; 11 Pages.
Alameen et al. ; Flexible all-solid-state supercapacitor based on polyhedron C-ZIF-8/PANI composite synthesized by unipolar pulse electrodeposition method ; Journal of Solid State Electrochemistry ; Oct. 31, 2020 ; 11 Pages.

\* cited by examiner

METHOD OF MAKING SUPERCAPACITOR VIA ELECTRODEPOSITION

STATEMENT OF PRIOR DISCLOSURE BY INVENTOR

Aspects of the present disclosure are described in W. Mahfoz, H. T. Das, S. S. Shah, M. Sanhoob, A. Anjum, A. R. Al-Betar, and M. A. Aziz, "Designing High-Performing Symmetric Supercapacitor by Engineering Polyaniline on Steel Mesh Surface via Electrodeposition"; Chem Asian J.; Dec. 28, 2022; 18; 4, incorporated herein by reference in its entirety.

STATEMENT OF ACKNOWLEDGEMENT

Support provided by King Fahd University of Petroleum and Minerals (KFUPM) under grant number INHE-2105 is gratefully acknowledged.

BACKGROUND

Technical Field

The present disclosure is directed to a supercapacitor, and particularly to a method of making a supercapacitor including polyaniline via electrodeposition.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

A supercapacitor is an electrochemical energy storage device (EESD) that has received much research attention due to its unique properties. Supercapacitors are generally characterized by their high-power density, fast charge, and discharge, long cycling stability, and a broad range of working temperatures. Supercapacitors may contain two electrodes separated by a separator saturated with an electrolyte. According to their charging/discharging nature, supercapacitors are classified into three main categories, electrochemical double-layer capacitors (EDLCs), pseudo-capacitors, and hybrid supercapacitors. An EDLC has an electrostatic charge-storage mechanism, where an EDLC electrode material attracts the oppositely charged ions of the electrolyte when a voltage is applied. In the case of a pseudo-capacitor, the charge-storage mechanism is a faradaic charge transfer and contains active redox compounds which store energy by redox reactions in a charge phase and release the stored energy by opposite reactions in a discharge phase. A hybrid supercapacitor uses both electrostatic and electrochemical mechanisms as a charge storage mechanism.

The EDLCs are generally fabricated using activated carbon, carbon aerogel, graphene, carbon sheets, and carbon nanotubes (CNTs), whereas transition metal oxides/hydroxides and conductive polymers are mostly used to fabricate pseudo-capacitors. Many transition-metal oxides and hydroxides, such as cobalt oxide hydroxide and nickel oxide/hydroxide, are reported as electrode materials of pseudo-capacitors. On the other hand, conductive polymers can be used to fabricate pseudo-capacitor devices due to their tunable electronic conductivity and high ability to dope different types of active redox materials. Many types of conductive polymers have been reported as pseudo-capacitor electrode materials; for instance, polyaniline (PANI), polypyrrole, thiophene, and their derivatives.

Polymerization of PANI can be done chemically or electrochemically. The electrochemical method is more environmentally friendly due to using a comparatively lower amount of chemical materials and solvents and can be powered by sustainable energy. To fabricate a pseudo-capacitor modified with electrodeposited PANI, the current collector, or substrate, should be a suitable catalytic and conductive metal. Many types of electrodes, like gold (Au) and silver (Ag), can be used for the electrodeposition of PANI, however such electrodes are expensive. On the other hand, stainless steel is a preferable current collector electrode due to its advantages, such as high conductivity, wide availability, rust resistance, and low cost.

Despite conductive polymers being used as an electrode material for supercapacitors, no easy and cost-effective preparation of an electrode material has yet to be developed. Hence, there is a need for a simple and efficient method that may circumvent the drawbacks of prior art.

SUMMARY

In an exemplary embodiment, a method of making a supercapacitor is described. The method includes mixing aniline and an acid to form a solution. The method includes contacting a reference electrode, a counter electrode, and a steel substrate with the solution to form an electrodeposition system. The method includes applying a potential greater than 0 to about 2 volts (V) to the electrodeposition system. The method includes depositing particles of polyaniline on a surface of the steel substrate to form a polyaniline electrode. The particles of the polyaniline have an oval sheet morphology with an average length of 100-300 nanometers (nm) and an average width of 50-150 nm. The method includes assembling two of the polyaniline electrodes in a symmetrical layered configuration with the surfaces having the particles of the polyaniline facing each other. An electrolyte is present between the two polyaniline electrodes to form the supercapacitor.

In some embodiments, the applying the potential is with cyclic voltammetry. An applied voltage is scanned in cycles from a potential of about 0 V to about 1 V.

In some embodiments, the method includes applying the potential in 1-20 cycles with cyclic voltammetry.

In some embodiments, the method includes applying the potential in 10-15 cycles with cyclic voltammetry.

In some embodiments, the cyclic voltammetry is performed at a scan rate of 10-100 millivolts per second (mV/s).

In some embodiments, the particles of the polyaniline are aggregated and form a porous coral structure on the steel substrate.

In some embodiments, pores of the porous coral structure have an average size of 0.5-3 micrometers (μm).

In some embodiments, the particles of the polyaniline form an interconnected cross-sectional fibril network of the surface of the steel substrate.

In some embodiments, the particles of the polyaniline include a polyaniline material having an emeraldine salt form.

In some embodiments, the emeraldine salt includes $SO_4^{2-}$.

In some embodiments, the particles of the polyaniline include a polyaniline material that is crystalline and amorphous.

In some embodiments, the steel substrate is a steel mesh substrate having apertures with the largest dimension of 75-200 μm and a wire width of 50-100 μm.

In some embodiments, the particles of the polyaniline form a layer on the surface of the steel mesh substrate. The apertures have a length of 75 to 150 μm and a width from 40 to 20 μm.

In some embodiments, the solution includes the aniline in a concentration of 0.1-1 molar (M).

In some embodiments, the solution includes the acid in a concentration of 0.1-5 M.

In some embodiments, the acid is selected from the group consisting of hydrochloric acid, nitric acid, sulfuric acid, hydrobromic acid, hydroiodic acid, and perchloric acid.

In some embodiments, the electrolyte is selected from the group consisting of hydrochloric acid, nitric acid, sulfuric acid, hydrobromic acid, hydroiodic acid, and perchloric acid.

In some embodiments, the supercapacitor has an energy density of 20-30 watt-hour per centimeter square (Wh/cm$^2$) at a power density of about 400 watts per centimeter square (W/cm$^2$).

In some embodiments, the supercapacitor has a specific capacitance of 250-400 millifarad centimeter square (mF cm$^{-2}$) at a current density of about 1-4 milliampere per centimeter square (mA cm$^{-2}$).

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
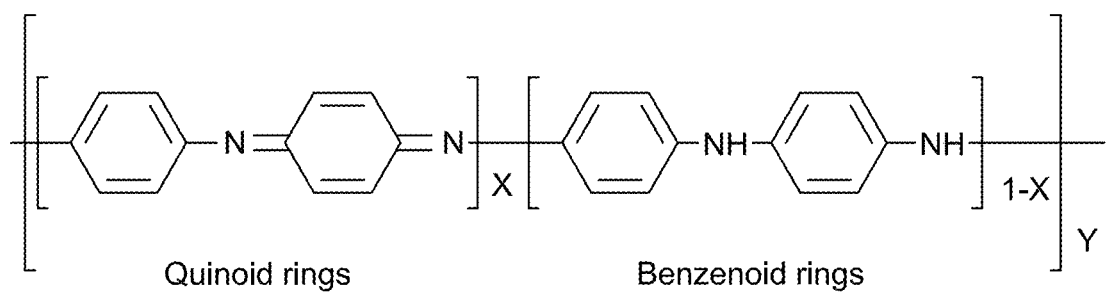
FIG. 1 is a schematic structure of polyaniline (PANI), according to certain embodiments.
Figure 2A:
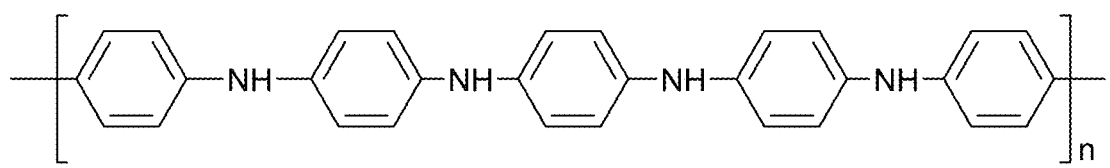
FIG. 2A is a schematic structure of leucoemeraldine (LM), according to certain embodiments.
Figure 2B:
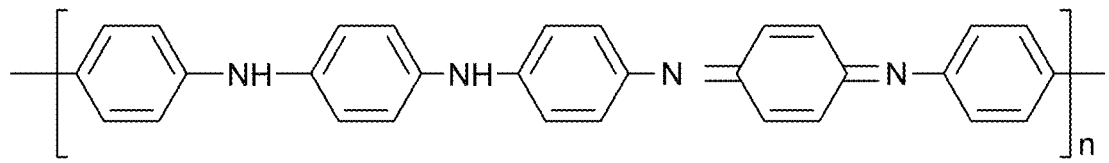
FIG. 2B is a schematic structure of an emeraldine base (EMB), according to certain embodiments.
Figure 2C:
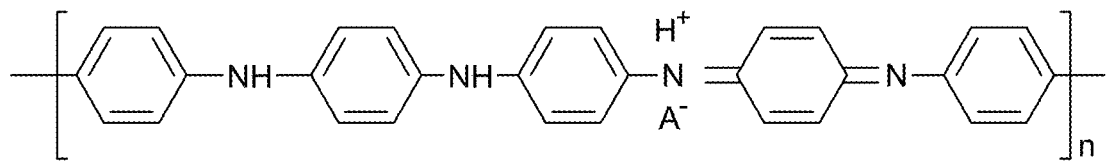
FIG. 2C is a schematic structure of an emeraldine salt (EMS), according to certain embodiments.
Figure 2D:
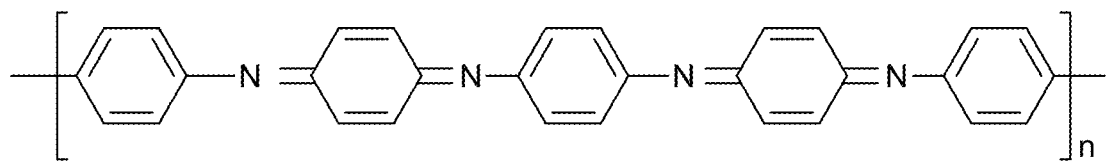
FIG. 2D is a schematic structure of pernigraniline (PE), according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Where a numerical limit or range is stated herein, the endpoints are included. Also, all values and subranges within a numerical limit or range are specifically included as if explicitly written out.

Aspects of the present invention are directed toward a method of making a supercapacitor. In the present disclosure, polyaniline (PANI) is electrodeposited on a substrate to produce a polyaniline electrode, also referred to as the electrode, and two of the electrodes are assembled in a symmetrical supercapacitor.

Figure 3:
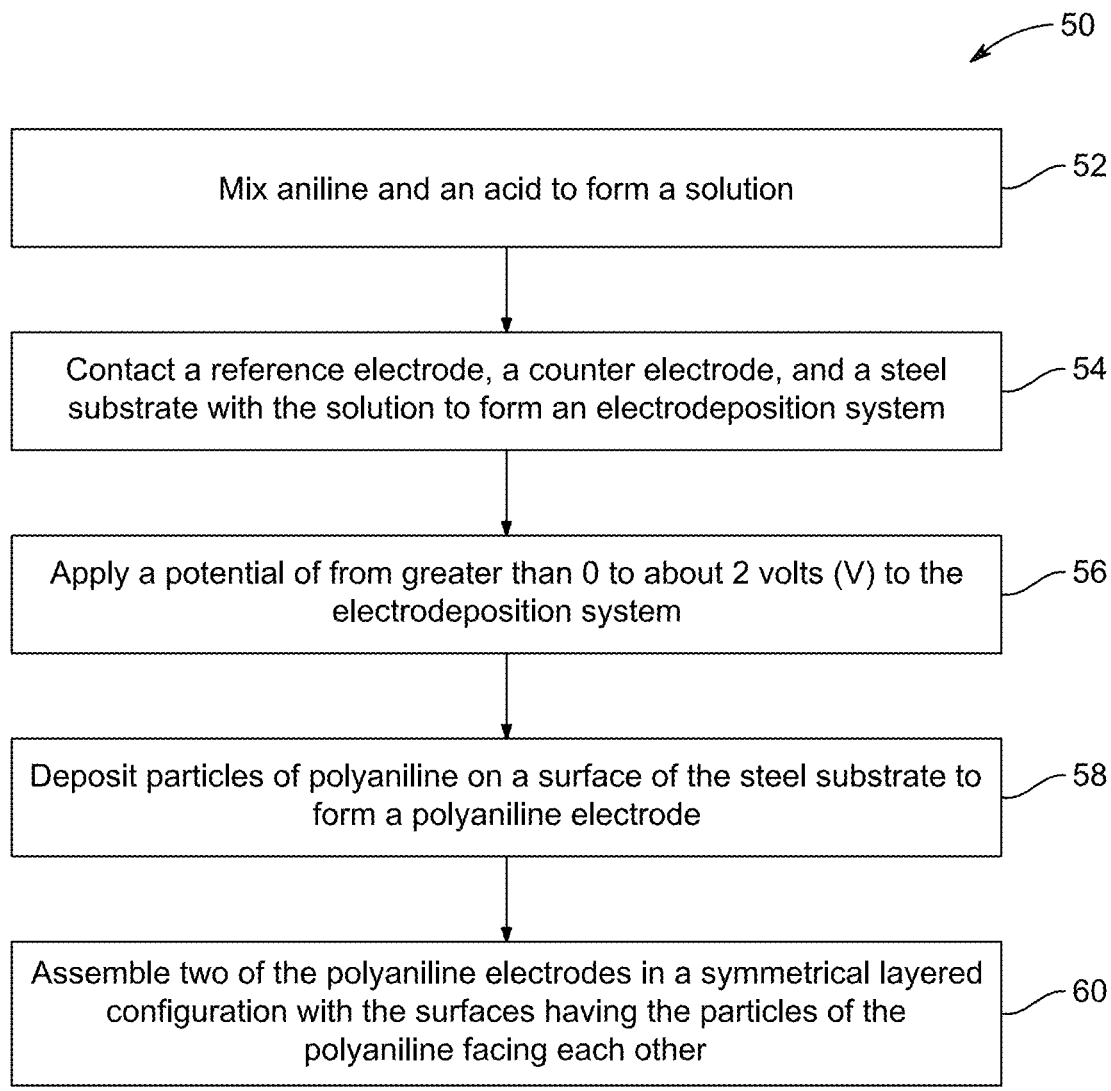
FIG. 3 is a schematic flow chart of a method of making a supercapacitor, according to certain embodiments.

FIG. 3 illustrates a schematic flow chart of a method 50 of making the electrode. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing aniline and an acid to form a solution. In some embodiments, the aniline dissolves in the acid to form a homogeneous solution. The concentration of aniline in the solution is in the range of 0.1-1 M, preferably 0.2-0.9 M, 0.3-0.8 M, 0.4-0.7 M, or 0.5-0.6 M while the concentration of the acid is in the range of 0.1-5 M, preferably 0.5-4.5M, 1.0-4.0 M, 1.5-3.5 M, 2.0-3.0 M, or about 2.5 M. The acid may be a strong acid or a weak acid. The acid is selected from hydrochloric acid, nitric acid, sulfuric acid, hydrobromic acid, hydroiodic acid, and perchloric acid. The acid may also include p-toluenesulfonic acid, methanesulfonic acid, or any combination thereof.

In some embodiments the aniline has the structure of Formula (I) below. In Formula (I) $R^1$-$R^5$ are each independently selected from a hydrogen, an alcohol, a carboxylic acid, an amine, a halogen, or a straight or branched alkyl chain having 1-10 carbon atoms. In a preferred embodiment, $R^1$-$R^5$ are each a hydrogen.

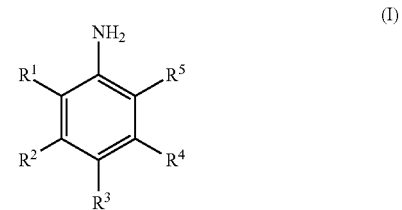

At step 54, the method 50 includes contacting a reference electrode, a counter electrode, and a steel substrate with the solution to form an electrodeposition system. As used herein, the term 'reference electrode' refers to an electrode with a stable and well-known electrode potential. In some embodiments, the reference electrode is selected from the group consisting of a standard hydrogen electrode (SHE), a calomel electrode, a silver-silver chloride (Ag/AgCl) electrode and glass electrode. In a preferred embodiment, the reference electrode is an Ag/AgCl electrode. Further, as used herein, the term 'counter electrode' refers to the electrode used in an electrochemical cell for voltammetric analysis or other reactions in which an electric current is expected to flow. An outer surface of the counter electrode may include an inert, electrically conducting chemical substance, such as platinum, gold, or carbon. The carbon may be in the form of graphite or glassy carbon. In one embodiment, the counter electrode may be a wire, a rod, a cylinder, a tube, a scroll, a sheet, a piece of foil, a mesh, or a perforated sheet. The counter electrode material should thus be sufficiently inert to withstand the chemical conditions in the electrolyte solution, such as acidic or basic pH values, without substantially degrading during the electrochemical reaction. In addition, the counter electrode should preferably not leach out any chemical substance that interferes with the electrochemical reaction or lead to undesirable electrode contamination. In a preferred embodiment, the counter-electrode is a platinum wire. As used herein, the term 'electrodeposition' refers to the controlled deposition of material on conducting surfaces using the electric current from a solution containing ionic species.

In some embodiments, the steel substrate is made from a material including but not limited to, stainless steel, crucible steel, carbon steel, spring steel, alloy steel, maraging steel, weathering steel, tool steel, or any combination thereof. The steel substrate have any shape known in the art such as a wire, a rod, a cylinder, a tube, a scroll, a sheet, a piece of foil, a mesh, or a perforated sheet. In a preferred embodiment, the steel substrate is a steel mesh substrate. In some embodiments, the steel mesh substrate has apertures with the largest dimension of 75-200 micrometers (μm), preferably 90-180 μm, 110-160 μm, or 130-150 μm and a wire width of 50-100 μm, preferably 60-90 μm, or 70-80 μm. In some embodiments, the apertures have a square, rectangle, circle, or oval shape. In a preferred embodiment, the apertures have a square shape.

In some embodiments, the reference electrode, the counter electrode, and the steel substrate may be connected through electrical interconnects that allow for the passage of current between the electrodes when a potential is applied between them. The reference electrode, the counter electrode, and the steel substrate may be arranged as obvious to a person of ordinary skill in the art.

At step 56, the method 50 includes applying a potential greater than 0 to about 2 volts (V) to the electrodeposition system, preferably 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0. In a preferred embodiment, the potential is applied with cyclic voltammetry. Generally in cyclic voltammetry, the working electrode (in this case the working electrode is the steel substrate) potential is ramped linearly versus time. Unlike in linear sweep voltammetry, after the set potential is reached in a CV experiment, the working electrode's potential is ramped in the opposite direction to return to the initial potential, for example it is ramped up from 0 to 2 V and then back down from 2 to 0 V. These cycles of ramps in potential may be repeated as many times as needed. The current at the working electrode is plotted versus the applied voltage (that is, the working electrode's potential) to give the cyclic voltammogram trace.

In some embodiments applied voltage is scanned in 1-20 cycles, preferably 2-19, 3-18, 4-17, 5-16, 6-15, 7-14, 8-13, 9-12, or 10-11 cycles. In a preferred embodiment, the number of scans is 10-15. In a preferred embodiment, the number of scans does not exceed 15. In some embodiments, the scan rate of the cyclic voltammetry is 10-100 millivolts per second (mV/s), preferably 20-190 mV/s, 30-180 mV/s, 40-170 mV/s, 50-160 mV/s, 60-150 mV/s, 70-140 mV/s, 80-130 mV/s, 90-120 mV/s, or 100-110 mV/s.

At step 58, the method 50 includes depositing particles of PANI on a surface of the steel substrate to form a polyaniline electrode (otherwise referred to as the electrode). In the process of applying the potential to the electrodeposition system the aniline in the solution is polymerized on the steel substrate.

PANI may contain two types of rings, which are quinoid and benzenoid. According to an aspect of the present disclosure, the PANI formula (FIG. 1), increasing the X value leads to an intensification in the oxidation phase of the polymer, where nitrogen (N) can be oxidized entirely in both rings, whereas increasing the Y value increases the polymer chain length. PANI can be doped with anions, changing PANI into a conductive polymer by increasing the electron orbitals in polymer chain structures. Such a type of doped PANI with X=0.5 is called emeraldine salt, distinguished for being a conductor from the other kinds of PANI. PANI exists in four forms (as shown in FIGS. 2A-2D): leucoemeraldine (LM), emeraldine base (EMB), emeraldine salt (EMS), and pernigraniline (PE). Leucoemeraldine PANI contains just quinoid rings, and its N is completely reduced (Table 1). Emeraldine base and salt types are partially oxidized with X=0.5. Emeraldine base is an insulator, whereas its salt form is conductive due to doping with anion. Pernigraniline PANI contains just benzenoid rings with X=1, and its N is fully oxidized.

TABLE 1

Types of PANI

| Form Name | X | Color | Conductivity | Oxidation status |
|---|---|---|---|---|
| Leucoemeraldine (LM) | 0 | Colorless | Insulator | Completely reduced |
| Emeraldine Base (EMB) | 0.5 | Blue | Insulator | Partially oxidized |
| Emeraldine salt (EMS) | 0.5 | Green | Conductor | Partially oxidized |
| Pernigraniline (PE) | 1 | Purple | Insulator | Completely oxidized |

In some embodiments, the PANI deposited on the surface of the steel substrate is a leucoemeraldine, emeraldine base, emeraldine salt, pernigraniline, or combinations thereof. In a preferred embodiment, the PANI is at least 50% EMS, preferably 60%, 70%, 80%, 90%, or entirely EMS. In some embodiments, the EMS is doped with an anion ($A^-$ in FIG. 2C) selected from sulfate, carbonate, nitrate, and a halogen. In a preferred embodiment, the emeraldine salt includes a sulfate anion, $SO_4^{2-}$. In some embodiment, the particles of the polyaniline have a polyaniline material that is one or both of crystalline and amorphous.

The polyaniline particles form a layer on the surface of the steel substrate. In some embodiments, 1-100 layers are deposited, preferably 10-90, 20-80, 30-70, 40-60, or about 50 layers. In an embodiment, polyaniline particles form a monolayer on the steel mesh substrate. In some embodiments, the polyaniline is deposited on a surface of both sides or one side of the steel substrate. In an embodiment, the polyaniline covers at least 10%, 20%, 30%, 40%, 50%, 60%, 70%, 80%, 90%, or entirely covers the steel substrate surface. In some embodiments, the layer is continuous and there are no isolated sections of particles of the polyaniline. The polyaniline particles form an interconnected cross-sectional fibril network on the surface of the steel substrate.

In some embodiments, the polyaniline particles have a shape of a sphere, cylinder, cone or cube. In some embodiments the polyaniline particles have a sheet morphology. In a preferred embodiment the polyaniline particles oval sheet morphology with an average length of 100-300 nanometers (nm), preferably 150-250 nm, or about 200 nm, and an average width of 50-150 nm, preferably 75-125 nm, or about 100 nm.

In some embodiments, the polyaniline particles are aggregated, forming a porous coral structure on the steel substrate. In the porous coral structure the polyaniline particles are randomly stacked on one another with some protrusions or tentacles forming from the base. In some embodiments, the protrusions are randomly oriented and have random lengths which do not exceed 1 μm, preferably 900 nm, 800 nm, 700 nm, 600 nm, or 500 nm. Protrusions and/or branches are preferably spaced from 0.5 μm to 5 μm, preferably 1 μm to 2 μm from one another on a common base. In some embodiments, the aggregates form pores have an average size, referring to the largest dimension, of 0.5-3 μm, preferably 1-2.5 μm, or 1.5-2 μm.

In some embodiments, when the substrate is a steel mesh substrate, as the particles of the polyaniline form a layer on the wire the apertures decrease in size as space is taken up by the polyaniline. In some embodiments, the apertures have a length of 75 to 150 μm, preferably 100-125 μm and a width from 40 to 20 μm, preferably about 30 μm. In some embodiments, if the aperture of the steel mesh is originally square before deposition, the deposition of the polyaniline particles is not uniform around in the square. In other words, following the deposition, the shape of the aperture is not maintained as square. In some embodiments, following deposition the aperture has a crescent shape.

The electrode may also include one or more binding compounds on the surface of the steel substrate. In some embodiments, the binding compound may be one or more selected from a group, including polyvinylidene fluoride (PVDF) and N-methyl pyrrolidone (NMP). In some embodiments, the binding compound may include, but is not limited to, manganese dioxide ($MnO_2$), nickel hydroxide [$Ni(OH)_2$], hydrogen storage alloy, lithium cobalt dioxide ($LiCoO_2$), lithium nickel dioxide ($LiNiO_2$), lithium manganese dioxide ($LiMnO_2$), carbon, graphite, an ethylene propylene diene monomer (EPDM). The electrode may further include one or more conductive additives. The binding compound and the conductive additives in an electrode impart a firm structure and a continuous conduction path. In some embodiments, the conductive additive may be one or more selected from a group including graphite, activated carbon (AC), reduced graphene oxide (rGO), carbon nanotubes (CNTs), carbon nanofibers (CNFs), and carbon black. In some embodiments, the conductive additive may include but is not limited to, carbide-derived carbon (CDC), carbon aerogel, and graphene. The conductive additive and binding compound may be on the steel surface prior to deposition. In some embodiments, for ease of synthesis the polyaniline electrode consists of polyaniline and the steel substrate.

At step 60, the method 50 includes assembling two of the PANI electrodes in a symmetrical layered configuration with the surfaces having the PANI particles facing each other. An electrolyte is present between the two PANI electrodes to form the supercapacitor. In another embodiment, the supercapacitor has an asymmetrical configuration and an electrode made of a different material is assembled with the electrode of the present disclosure. One of skill in the art would recognize the configuration of an asymmetrical supercapacitor.

In some embodiments, the electrolyte is a redox electrolyte. In some embodiments, the electrolyte includes an acid. In some embodiments, the electrolyte includes a solvent. In some embodiments, the electrolyte includes an acid and a solvent. In some embodiments, the acid is a strong acid. Suitable examples of the acid include, perchloric acid, hydroiodic acid, hydrobromic acid, hydrochloric acid, sulfuric acid, p-toluenesulfonic acid, methanesulfonic acid, or any combination thereof. In some embodiments, the solvent includes tetrahydrofuran, ethyl acetate, dimethylformamide, acetonitrile, acetone, dimethyl sulfoxide, nitromethane, propylene carbonate, ethanol, formic acid, n-butanol, methanol, acetic acid, water, or any combination thereof. The electrolyte is selected from hydrochloric acid, nitric acid, sulfuric acid, hydrobromic acid, hydroiodic acid, and perchloric acid. In some embodiments, a separator may also be present in the supercapacitor. The separator may be selected from a group including polypropylene (PP) membrane, glass fiber, and cellulose fiber. In some embodiments, the separator may include bacterial cellulose fiber, a polyolefin such as polyethylene (PE), or a combination of PP and PE. In some embodiments, the separator is soaked in a solution of the electrolyte before incorporation into the supercapacitor.

The supercapacitor has an energy density of 20-30 $Wh/cm^2$, preferably 22 $Wh/cm^2$, 24 $Wh/cm^2$, 26 $Wh/cm^2$, or 28 $Wh/cm^2$ at a power density of about 400 $W/cm^2$. As used herein, the 'energy density' refers to the total energy in a system per unit volume. As used herein, the 'power density' refers to the amount of power per unit volume. In some embodiments, the supercapacitor has a specific capacitance of 250-400 $mF·cm^{-2}$, preferably 275-375 $mF·cm^{-2}$, 300-350 $mF·cm^{-2}$ or about 325 $mF·cm^{-2}$ at a current density of about 1-4 $mA·cm^{-2}$, preferably 2-3 $mA·cm^{-2}$. As used herein, the term 'current density' refers to the amount of current traveling per unit cross-section area. In some embodiments, the supercapacitor has a high stability, as the initial capacitance is maintained (±10%) after 1000 charge/discharge cycles.

In some embodiments, a wearable device includes the supercapacitor. The wearable device may include, but is not limited to, a smart ring, a smartwatch, a smart wristband such as a fitness tracker, augmented reality (AR) headsets, and reality (MR) headsets. The supercapacitor may be electrically connected to a sensor and function as a battery. In some embodiments, two or more supercapacitors may be connected in parallel and/or series.

EXAMPLES

The following examples describe and demonstrate exemplary embodiments of the method 50 described herein. The examples are provided solely for the purpose of illustration. They are not to be construed as limitations of the present disclosure, as many variations thereof are possible without departing from the spirit and scope of the present disclosure.

Example 1: Materials Required

Aniline was obtained from BDH Chemicals Ltd., Poole, England. Hydrochloric acid (HCl) and $H_2SO_4$ were obtained from Macron fine chemicals, perchloric acid ($HClO_4$), ethanol, acetic acid ($CH_3COOH$), and nitric acid ($HNO_3$) were procured from Sigma-Aldrich, 3050 Spruce St Saint Louis, MO, 63103-2530. Phosphoric acid ($H_3PO_4$) was obtained from Fluka. All the equipment and glassware were cleaned and rinsed with distilled water, and the chemical solutions were prepared using deionized (DI) water.

Example 2: Steel Mesh Electrode (SME) Preparation

SMEs were cut by a scissor in a particular dimension to provide a suitably shaped strip. Next, the SME strips were sonicated in ethanol for 15 min. Then, the SME strips were rinsed with DI water and cleaned again by sonication in DI water for 15 min. Finally, the SME strips were rinsed with DI water for the second time and dried at 50° C. for 30 min in an electric oven.

Example 3: PANI-Modified SME Preparation and Symmetric Supercapacitor Fabrication PANI electrodeposition was accomplished in a solution of 0.5 M of aniline in 1 M $H_2SO_4$ using the CV technique at 50 mV/s (402, FIG. 4). The electrodeposition was done using an operating potential window (OPW) from 0 to 1 V for 15 cycles in a three-electrode system. The SME, Ag/AgCl, and Pt wire were used as a working electrode (WE), reference electrode (RE), and counter electrode (CE), respectively. After starting the CV, the green layers of PANI began forming on the SME (404, FIG. 4). The number of cycles of the polymerization process was from 1 to 15 cycles. Finally, the formed PANI/SME was rinsed gently with DI water and dried at room temperature. Two of the prepared PANI/SME (geometrical area 1 $cm^2$) were used as two electrodes separated with a separator (filter paper) saturated with a solution of $H_2SO_4$ (0.1 M) to fabricate the PANI/SME-based symmetric supercapacitor (406, FIG. 4).

Example 4: Electrochemical Measurements

Figure 4:
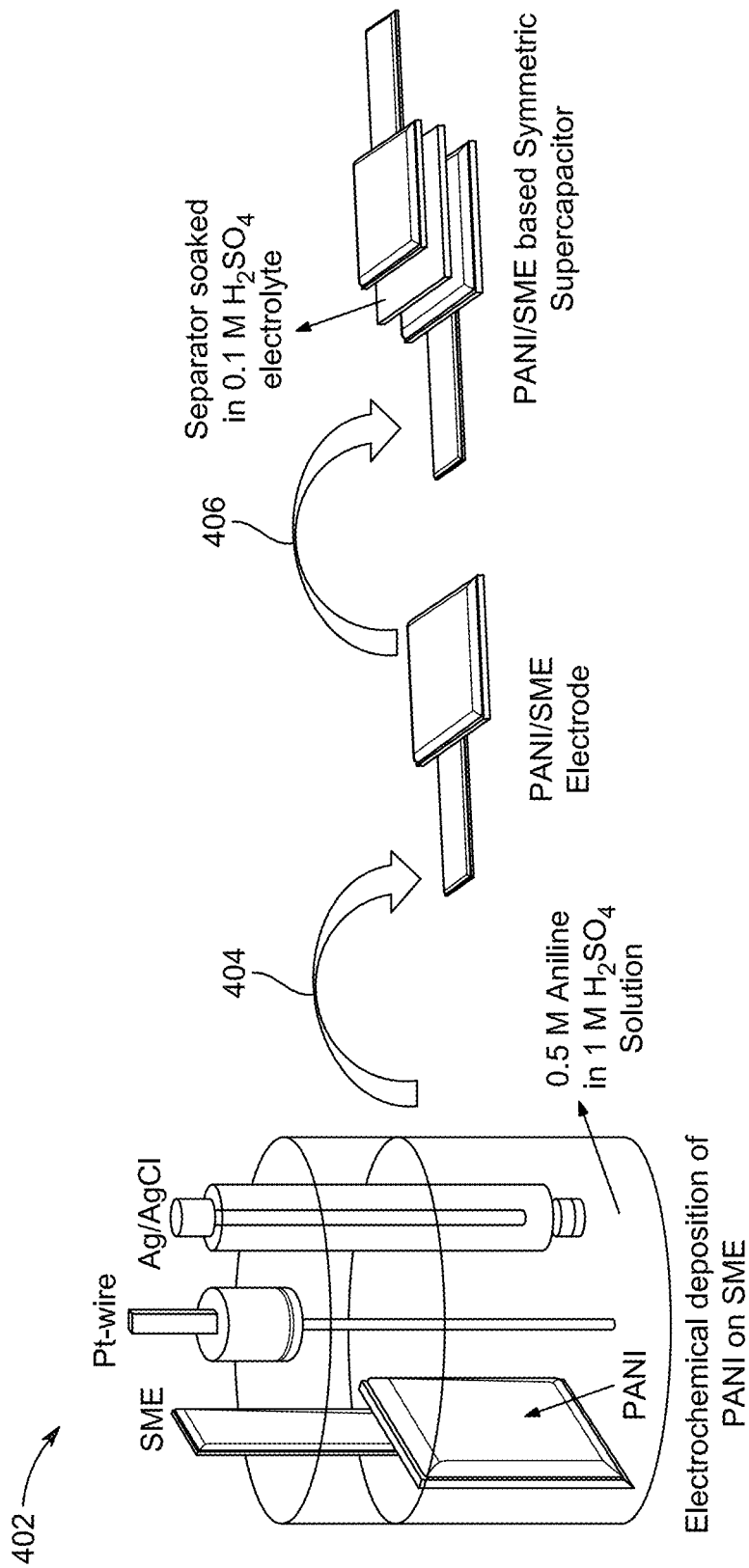
FIG. 4 is a schematic representation of a steel mesh electrode (SME) modified with PANI (PANI/SME electrode) via electrochemical deposition and the fabrication of a PANI/SME electrodes-based symmetric supercapacitor, according to certain embodiments.

Different electrochemical measurements were done to calculate the performance of the developed supercapacitor, including CV, galvanostatic charge/discharge (GCD), and electrochemical impedance spectroscopy (EIS). The electrochemical parameters of the experiments were performed with an electrochemical workstation (760E-CHI, CH Instruments, Inc., USA). Basic electrochemical properties of the WE materials (PANI/SME) were also tested using a three-electrode electrochemical system (FIG. 4). Here, Ag/AgCl and a platinum wire were used aa RE and CE, respectively. The areal capacitance ($C_{ar}$) of the fabricated supercapacitor device applied in the two-electrode system was calculated based on equation (1).

$$C_{ar} = \frac{\int IdV}{S \times v \times \Delta V} \quad (1)$$

$C_{ar}$ represents the areal capacitance measured by the unit of Farad cm$^{-2}$ (F cm$^{-2}$), $\int I\,dV$ signifies the integrated area value under the CV measured by the unit of Watt (W), S denotes the area of the active electrode material measured by the unit of cm$^{-2}$, v is the scan rate measured by the unit of V s$^{-1}$, and $\Delta V$ represents discharging potential voltage range measured by the unit of a volt (V).

On the other side, the $C_{ar}$ of the tested electrodes applied in GCD was calculated based on equation (2).

$$C_{ar} = \frac{I \times t}{S \times \Delta V} \quad (2)$$

$C_{ar}$ represents the areal capacitance measured by the unit of F·cm$^{-2}$. I represents the discharging current used by the unit of Ampere (A), t symbolizes the discharging time measured by the unit of second(s), S represents the mass of the active electrode material measured by the unit of cm$^2$, and $\Delta V$ represents discharging potential voltage range measured by the unit of volt (V).

According to the supercapacitor device performance, other essential values are energy density (E), which was calculated based on equation (3), and power density (P), which was calculated based on equation (4).

$$E = \frac{1}{2} \times \frac{C_{ar}\Delta V^2}{3600} \quad (3)$$

$$P = \frac{3600 \times E}{\Delta t} \quad (4)$$

E is the energy density measured by the unit of Wh/cm$^2$, $C_{ar}$ represents the areal capacitance measured by the unit of F·cm$^{-2}$, $\Delta V$ represents the applied potential range measured by the unit of volt (V), P is the power density calculated by the unit of W/cm$^2$, and $\Delta t$ signifies the discharging time measured by the unit of s.

Example 5: Characterization Techniques

The morphology, including size and shape, and chemical composition of the prepared electrode material were recorded using a field emission scanning electron microscope (FESEM) equipped with energy-dispersive X-ray spectroscopy (EDS) detectors (manufactured by Tescan, Libušina tř. 1, Brno-Kohoutovice, 623 00 Brno, Czechia) and transmission electron microscopy (TEM) (JEM-2011 (manufactured by JEOL, Musashino Akishima, Tokyo, 196-0021 Japan). X-ray diffraction analysis (XRD) was done by a MiniFlex II desktop X-ray diffractometer (manufactured by Rigaku, 2601A, Tengda Plaza, No. 168, Xizhimenwai Ave) fitted with Cu—Kα radiations and having a wavelength of 1.54056 angstroms (Å). The XRD curve was obtained at 2θ, ranging from 5° to 90° at a 1°/min scan speed and with a step size of 0.02°. In addition, the current and voltage parameters were set during the function at 30 milliamperes (mA) and 45 kilovolts (kV), respectively. Fourier-transform infrared (FT-IR) spectroscopy was recorded via Nicolet 6700 (manufactured by Thermo Scientific™, 168 Third Avenue, Waltham, MA, USA 02451).

Figure 5A:
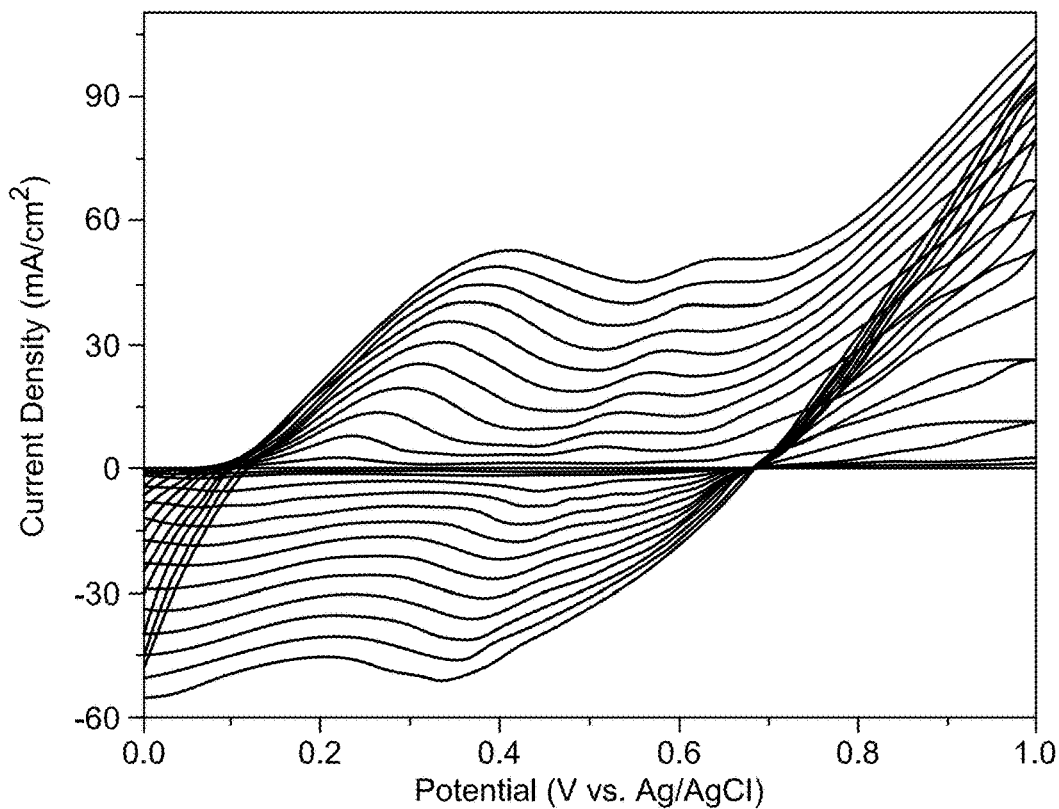
FIG. 5A depicts cyclic voltammetry (CV) curves of 15 cycles for electro-polymerization of PANI on the SME at 50 millivolts per second (mV/s) in a solution of 0.5 molars (M) aniline in 1 M sulfuric acid, according to certain embodiments.

Example 6: Electrodeposition of PANI on SME and Electrochemical Characterization of PANI/SME Electrode PANI was deposited on SME at 50 mV/s in a solution of 0.5 M aniline in 1 M sulfuric acid in an OPW from 0 to 1 V using Ag/AgCl as a RE and platinum wire as a CE. FIG. 5A indicates CV curves of 15 cycles for the electro-polymerization of PANI on the SME. The current density of the voltammogram rises by increasing the polymerization cycle number, indicating PANI growth on the SME surface. In the initial positive potential sweep cycles, the mono-aniline oxidized around 0.85 V (vs. Ag/AgCl), showing a distinct irreversible oxidation peak. By PANI deposition, the height of the aniline oxidation peak decreases and disappears later throughout the deposition process. Two oxidation peaks are noticeable around 0.3 V and 0.6 V, which are attributed to the oxidation of LM to EMS and EMS to PE, respectively. At the same time, the reduction peaks around 0.1 V and 0.4 V are attributed to the reversible reactions. The oxidation and reduction peaks shift by increasing the cycle number due to the growth of PANI on the SME surface, which increases the current density and shifts the redox potential.

Figure 5B:
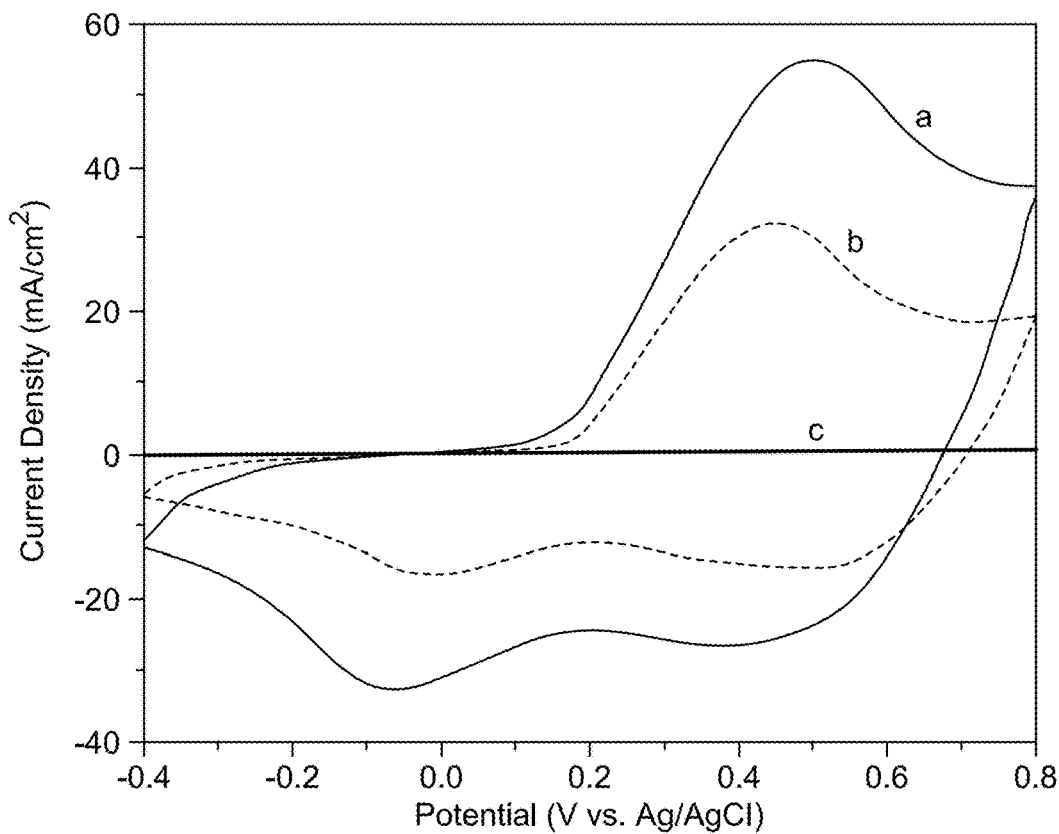
FIG. 5B depicts CV curves of the PANI/SME electrode prepared by PANI deposition at different CV cycles, such as 15 (a), 10 (b), and 5 cycles (c) in 0.1 M sulfuric acid measured at 50 mV/s, according to certain embodiments.
Figure 5C:
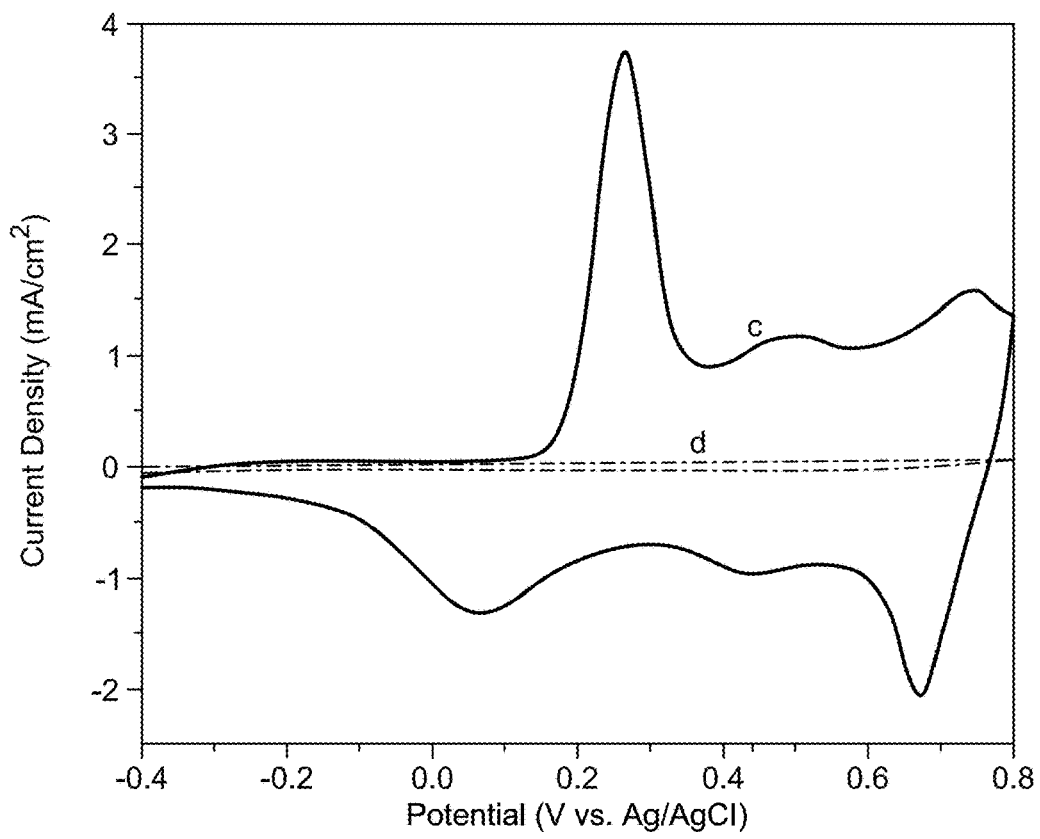
FIG. 5C depicts CV curves of the PANI/SME electrode prepared by PANI deposition at 5 CV cycles (c), and a bare SME (d) in 0.1 M sulfuric acid measured at 50 mV/s, according to certain embodiments.

CV curves of three PANI/SMEs and a bare SME were recorded using a three-electrode system to calculate the effect of the number of polymerization cycles on the capacitance performance (FIG. 5B and FIG. 5C). CV measurements were accomplished at 50 mV/s in a solution of 0.1 M sulfuric acid using Ag/AgCl and platinum wire in an OPW from −0.4 V to 0.8 V. Three PANI/SMEs were designed with different deposition cycle numbers of 5, 10, and 15 cycles. The area under CV curves increased with a number of cycles, indicating an increase in the capacitance of PANI/SME. However, unexpectedly the film prepared using >15 deposition cycles was not stable. As a result, the deposition of PANI was limited to 15 cycles. The PANI/SMEs prepared by deposition cycle numbers of 10 and 15 cycles show one oxidation peak around 0.5 due to the oxidation of LE into EMS (FIG. 5B (a, b)). The oxidation peak shifts toward a more positive potential in the case of the electrode surface prepared by the high deposition cycle number due to the increase of the PANI surface and the current density. For the same two PANI/SME surfaces, two reduction peaks were observed around −0.1, and 0.5 V, attributed to the reduction of EMS into LE and PE into EMS, respectively. Similarly, the two oxidation peaks shift into the more negative potential in the PANI/SME surface prepared by the high deposition cycle number. The PANI/SME prepared by deposition cycle numbers of 5 cycles shows three oxidation peaks (0.1, 0.5, and 0.7 V) (FIG. 5C).

Figure 5D:
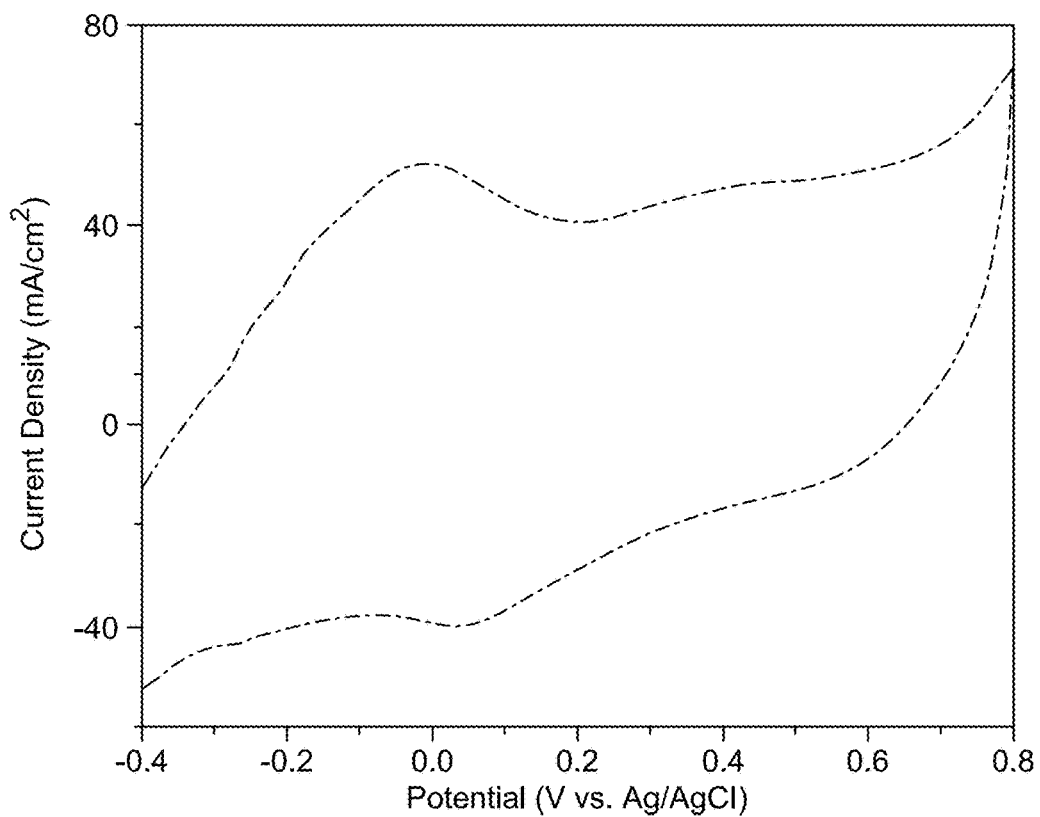
FIG. 5D depicts CV curves of the bare SME in 0.1 M sulfuric acid measured at 50 mV/s, according to certain embodiments.

Two oxidation peaks around 0.1 and 0.7 V are attributed to LE oxidation into EMS and PE, respectively. Although the oxidation peak around 0.5 V vs. Ag/AgCl is attributed to dimers oxidation, the peak disappears with the growth of PANI. All the PANI/SMEs show much higher capacitance than the bare SME. The bare SME shows a small CV area with a current density in the rank of μA (FIG. 5C and FIG. 5D). Furthermore, the bare SME voltammogram shows two oxidation peaks around −1 V and 0.4 V and two reduction peaks around 0.05 V and 0.6 V attributed to the redox of stainless-steel metals of Fe and Ni (FIG. 5D). However, the PANI/SME prepared by deposition cycle number of 15 cycles was selected as an electrode due to its high capacitance compared to the other PANI/SMEs. In addition, PANI/SME with a higher deposition cycle number (more than 15) shows unstable dense PANI layers.

Example 7: Structural, Chemical, and Morphological Characterization

Figure 6A:
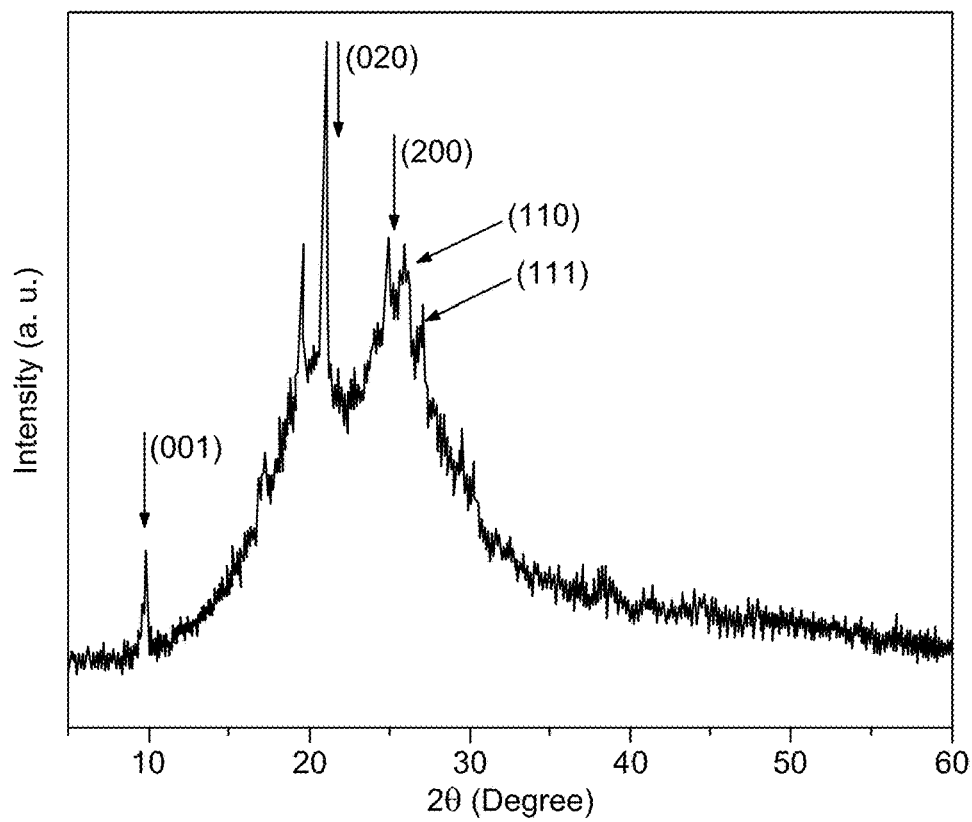
FIG. 6A depicts an X-ray diffraction (XRD) pattern of the synthesized PANI on the SME from a solution of mono-aniline (0.5 M) in sulfuric acid (1 M) by using the CV technique at 50 mV/s in a potential widow from 0 to 1 V (vs. Ag/AgCl) for 15 cycles in a three-electrode system, according to certain embodiments.
Figure 6B:
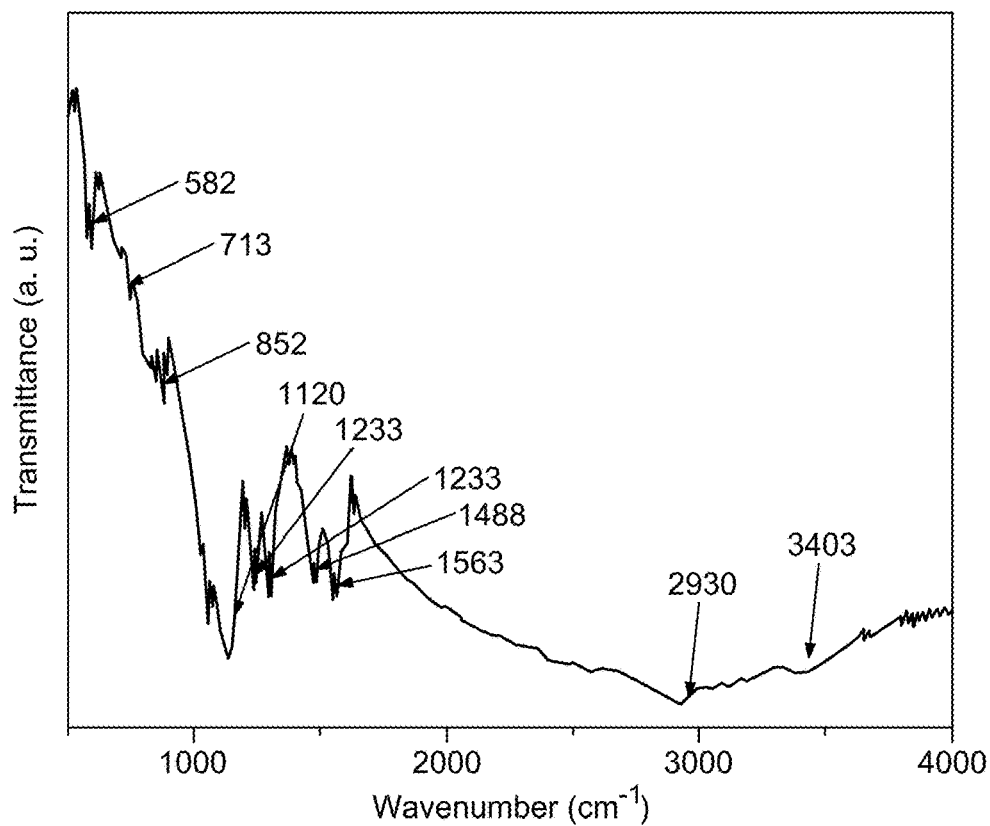
FIG. 6B depicts the Fourier-transform infrared (FT-IR) spectroscopy spectrum of the synthesized PANI on the SME from the solution of mono-aniline (0.5 M) in sulfuric acid (1 M) by using the CV technique at 50 mV/s in a potential widow from 0 to 1 V (vs. Ag/AgCl) for 15 cycles in a three-electrode system, according to certain embodiments.

The synthesized PANI on the SME electrode was investigated using the XRD (FIG. 6A). The XRD pattern shows the PANI structure in the sample. The broad peaks between 2θ=10° and 2θ=30° confirm that the formed PANI contains an amorphous structure. Crystal peaks at 2θ=9.9°, 21.1°, 24.8°, 25.9°, and 27.1° indicate (001), (020), (200), (110), and (111) crystal planes, respectively, which indicates the emeraldine salt form of PANI. Peaks at 2θ=21.1 and 19.5 are associated with the frequency of parallelity and perpendicularity to the PANI chain. Similarly, FT-IR confirms the structure of PANI (FIG. 6B). Peak at 582 cm$^{-1}$ indicates the presence of C—N—C bonding mode in the aromatic ring. The peak at 713 cm$^{-1}$ indicates C—C and C—H bonding mode in the aromatic ring.

The peak at 825 cm$^{-1}$ indicates the presence of C—H out-of-plane bonding in the benzenoid ring. A peak at 1120 cm$^{-1}$ shows the presence of S=O bonding due to $SO_4^{-2}$ ions doping. Peaks at 1233, 1296, and 1488 cm$^{-1}$ indicate the presence of C—N stretching in the benzenoid ring. Finally, the peak at 1563 cm$^{-1}$ shows C=N stretching in the quinoid ring.

The peak at 2930 cm$^{-1}$ manifests the symmetric stretch vibration band of methylene [—(CH$_2$)$_n$—]. Finally, the peak at 3403 cm$^{-1}$ points to the vibration band of —OH due to moisture. As a result, the FT-IR spectrum exhibits different chemical bonds, which belong to both types of benzenoid and quinoid rings. Furthermore, the spectrum confirms the emeraldine form of PANI forming. In addition, S=O bonding, which belongs to the presence of $SO_4^{-2}$ ions, confirms the emeraldine salt-forming.

Figure 7A:
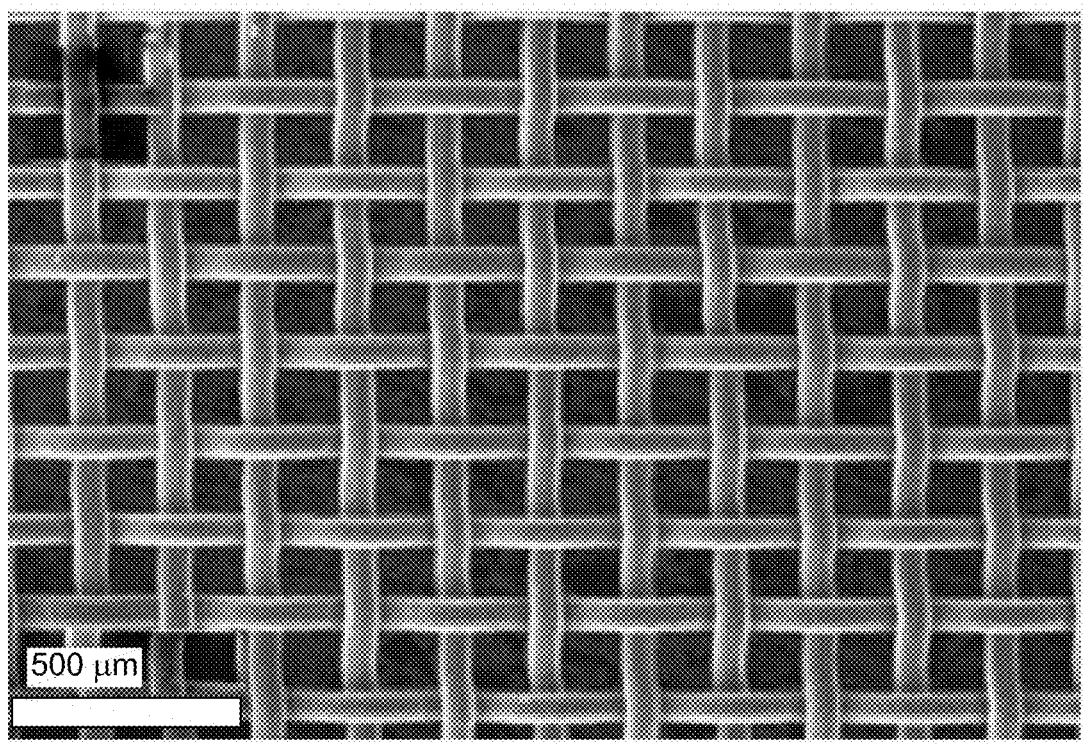
FIGS. 7A-7E depict field emission scanning electron microscope (FESEM) images of the SME, at different magnifications, according to certain embodiments.
Figure 7B:
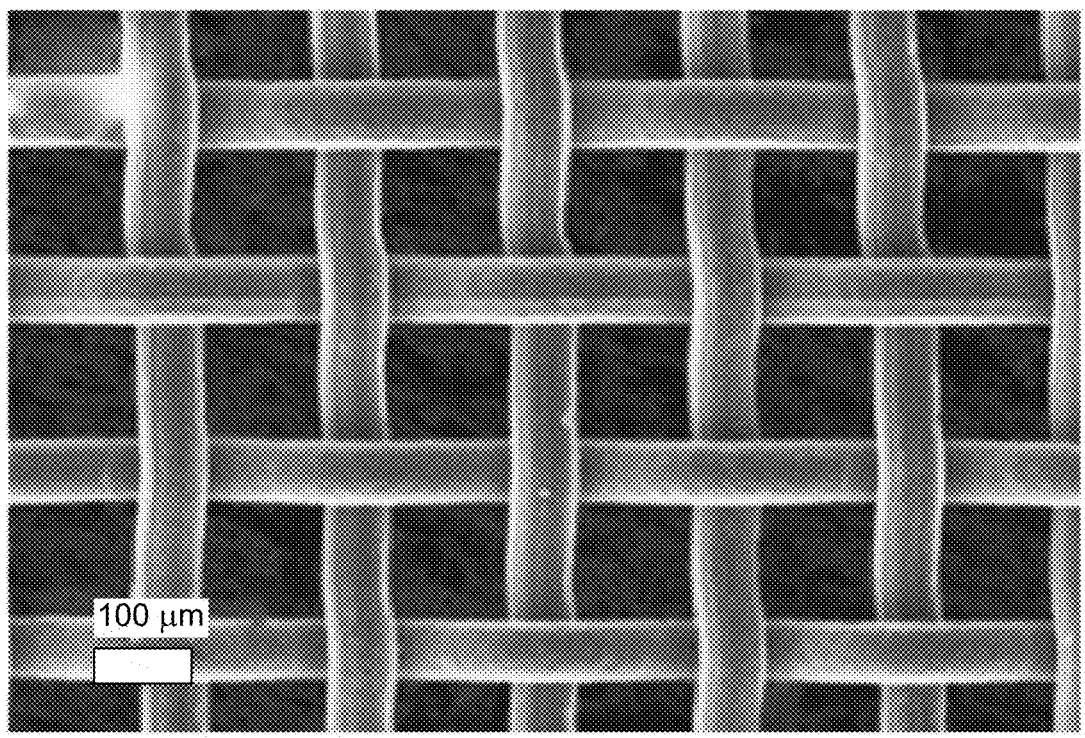
Figure 7C:
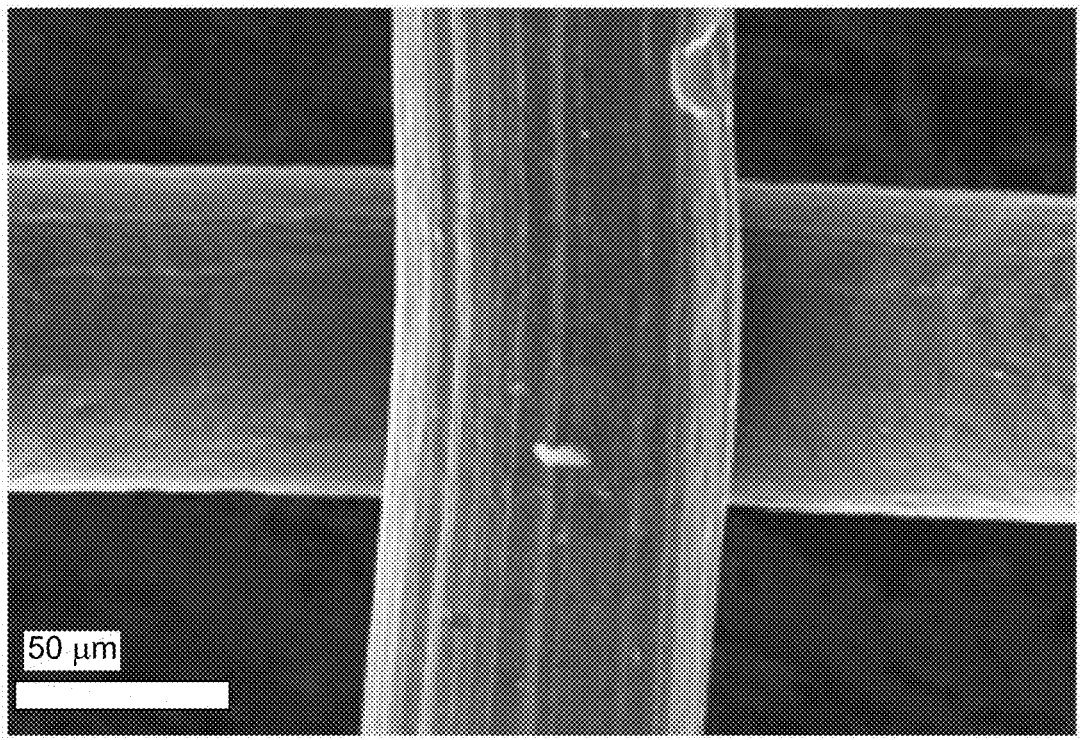
Figure 7D:
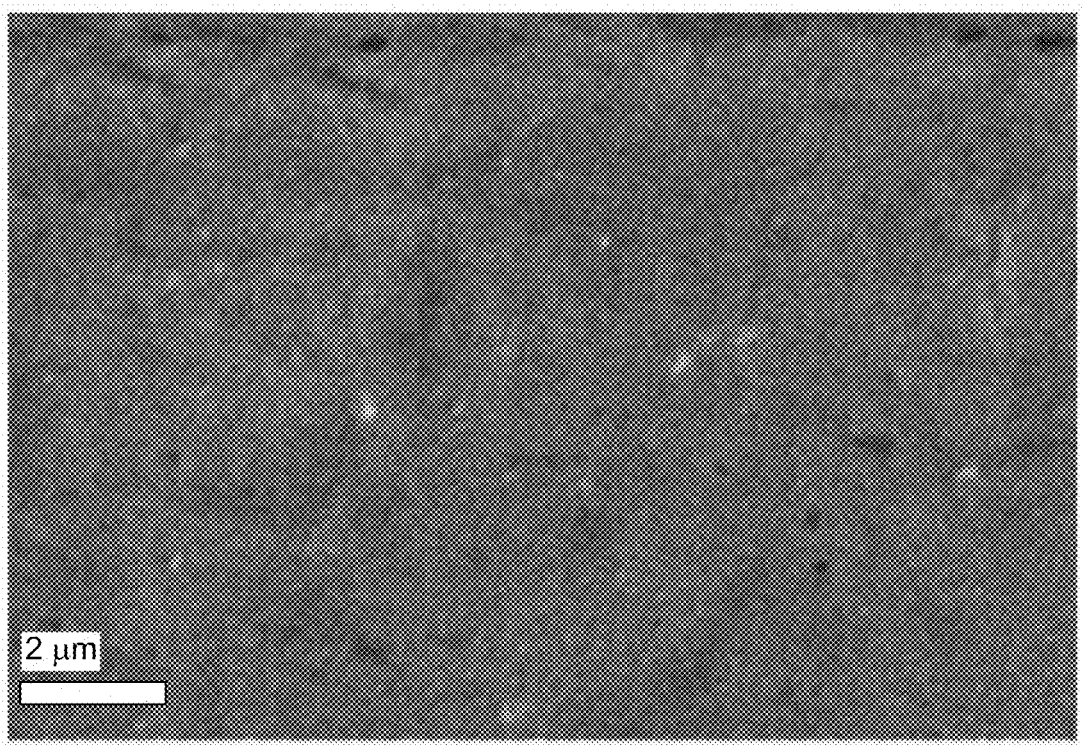
Figure 7E:
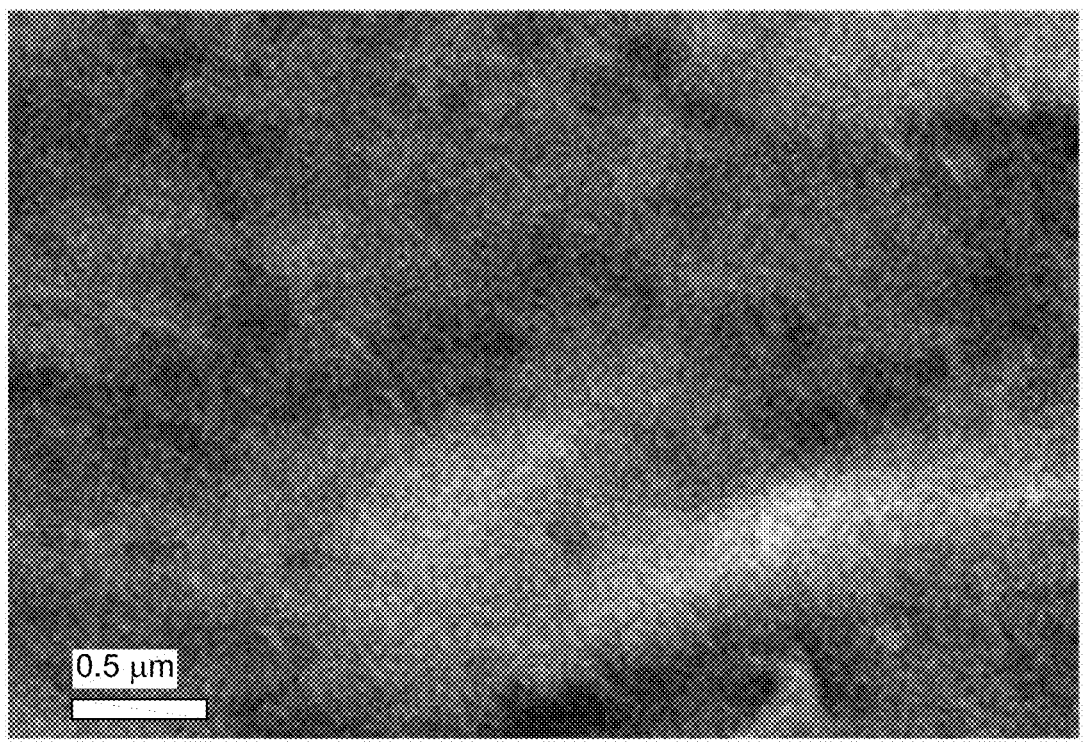
Figure 7F:
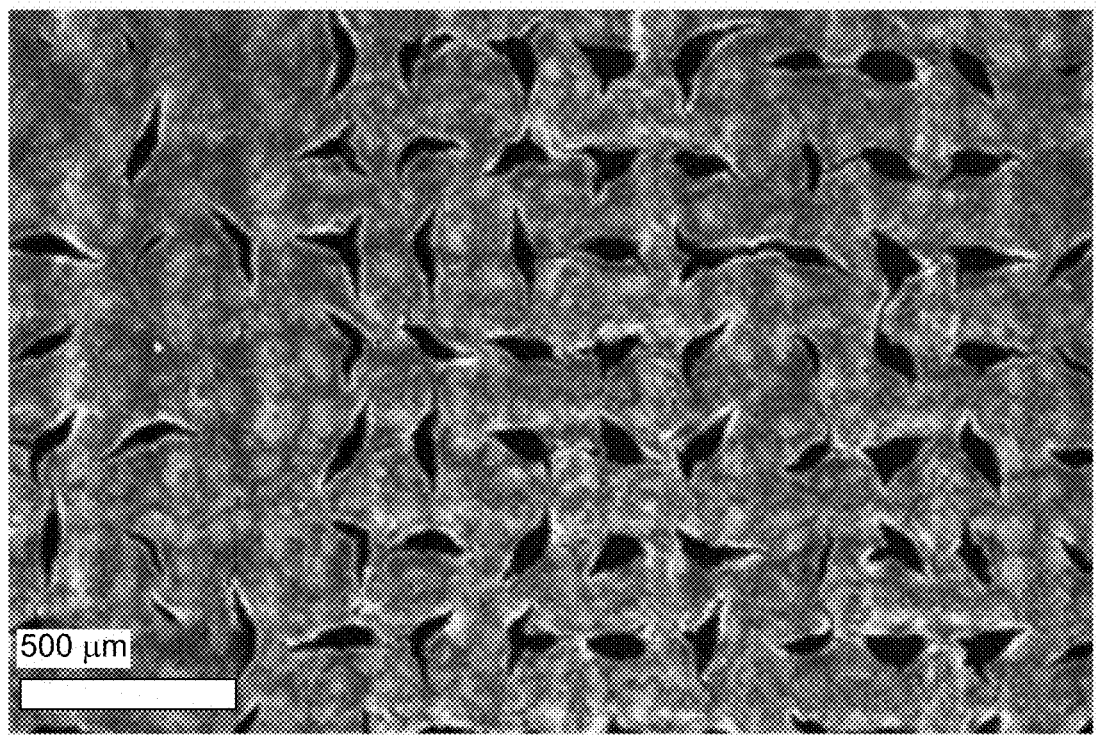
FIGS. 7F-7J depict field emission scanning electron microscope (FESEM) images of the PANI/SME electrode, at different magnifications, according to certain embodiments.
Figure 7G:
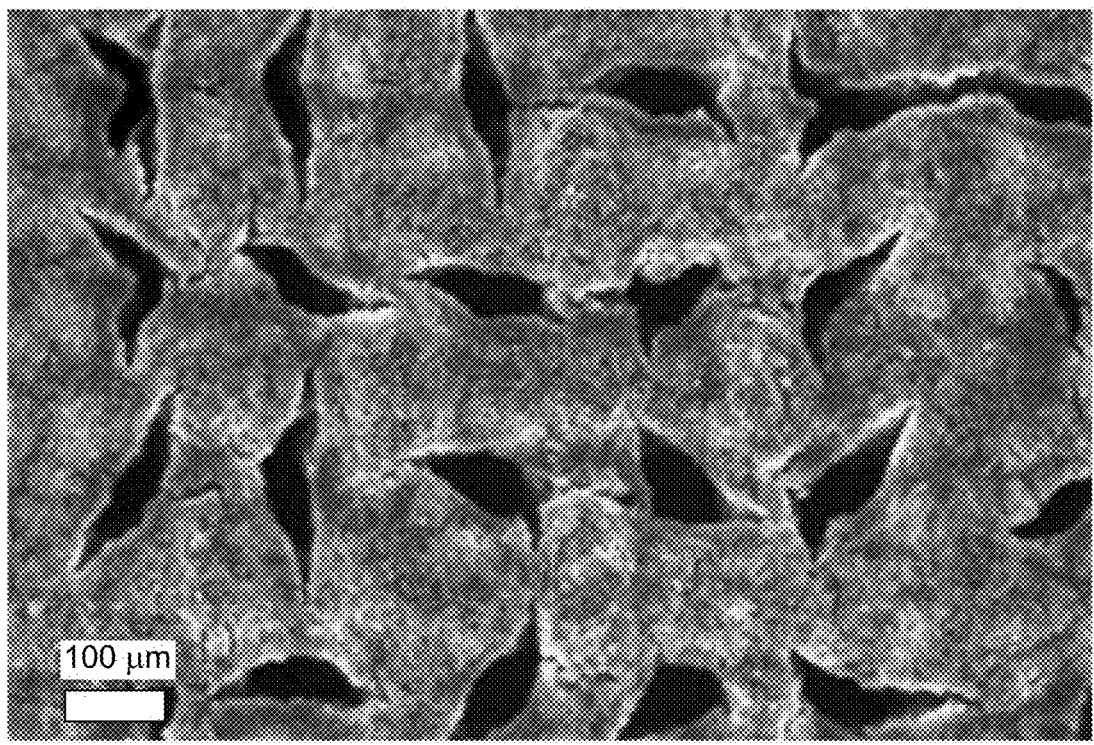

The morphological study of SME and PANI/SME surfaces was investigated by FESEM at different magnifications (FIGS. 7A-7J). The bare SME images show a metallic net with crisscross stainless-steel wires and regular apertures (FIGS. 7A-7C). The SME wire width is around 75 μm; while the net apertures have a square shape with a square side of approximately 100 μm (FIG. 7B). According to the highly magnified images, the SME has a metallic plane surface with scarce small bumps (FIGS. 7D-7E). On the other hand, the PANI/SME FESEM images display a compact porous layer of polymer covering the metallic net of the SME. The polymer layer formed around the stainless-steel wires, leaving slot-like openings (FIGS. 7F-7G).

Figure 7H:
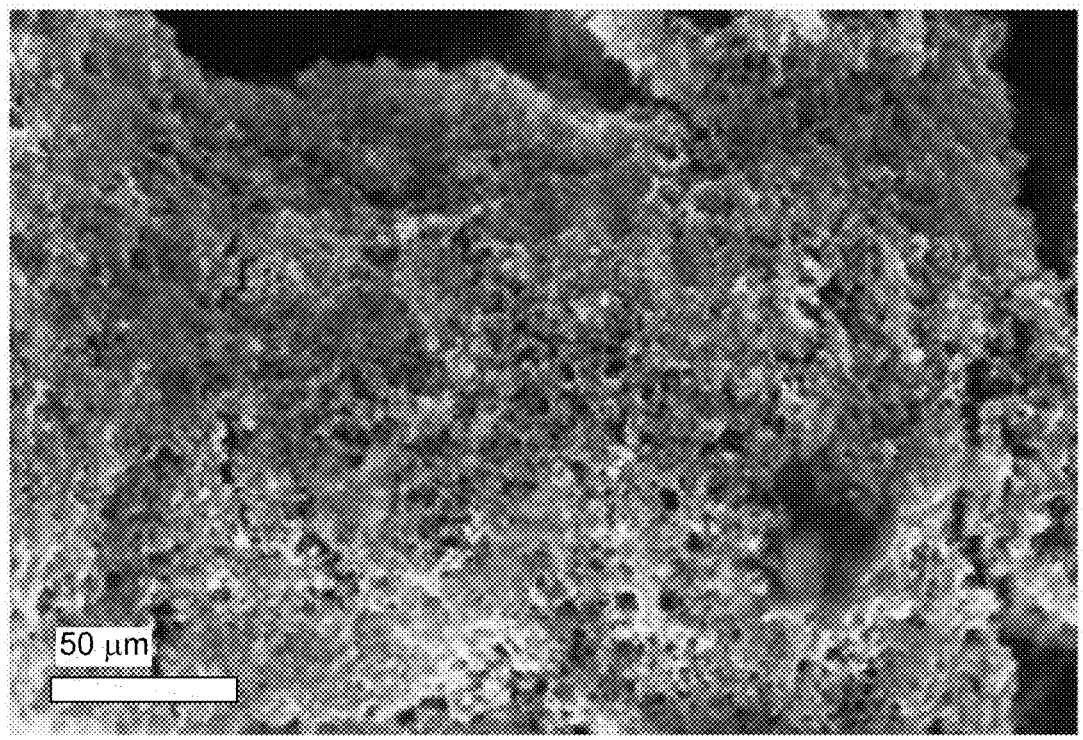
Figure 7I:
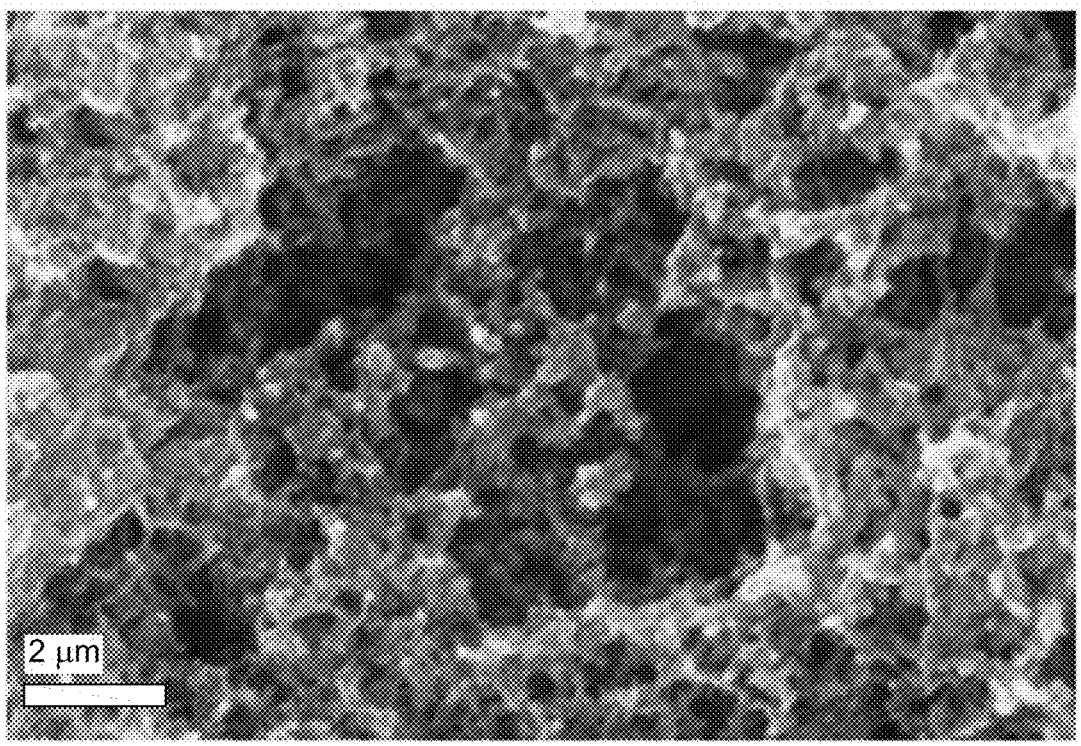
Figure 7J:
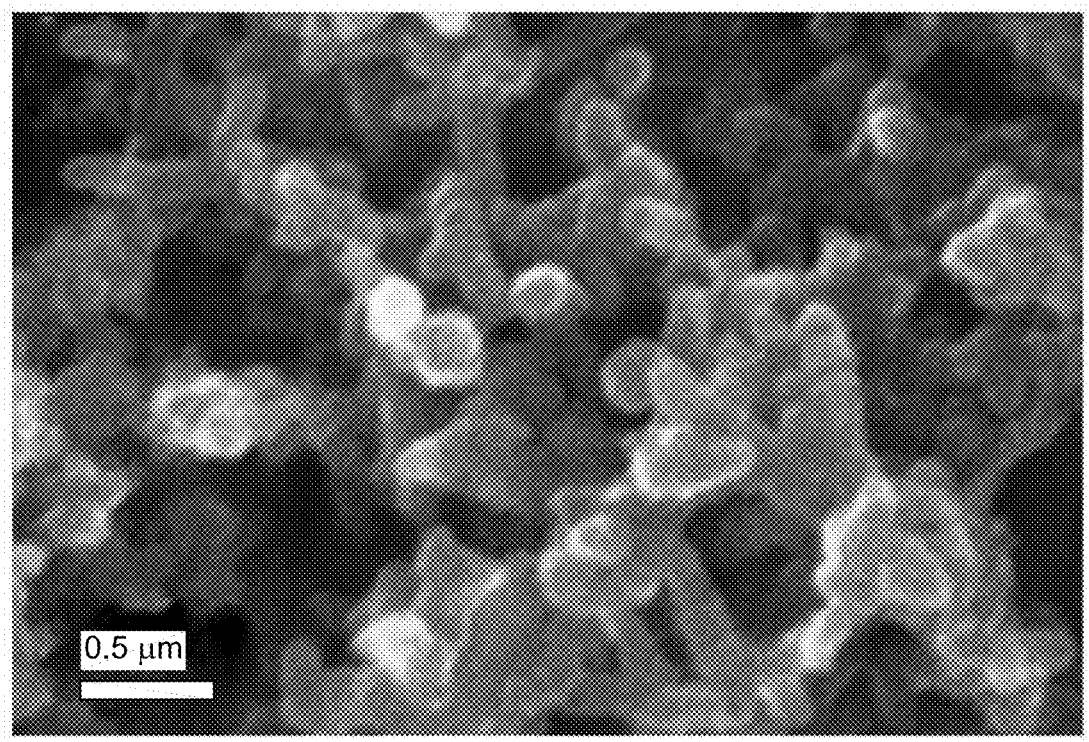

The length of the opening ranges between 75 to 150 μm, whereas the width ranges from 40 to 20 μm (FIG. 7G). High-magnified images show a rich porous surface with a coral morphology (FIGS. 7H-7J). PANI grew on the SME surface, creating a cross-sectional fibril network with an interconnected nanostructured PANI (FIGS. 7H-7J).

Figure 8A:
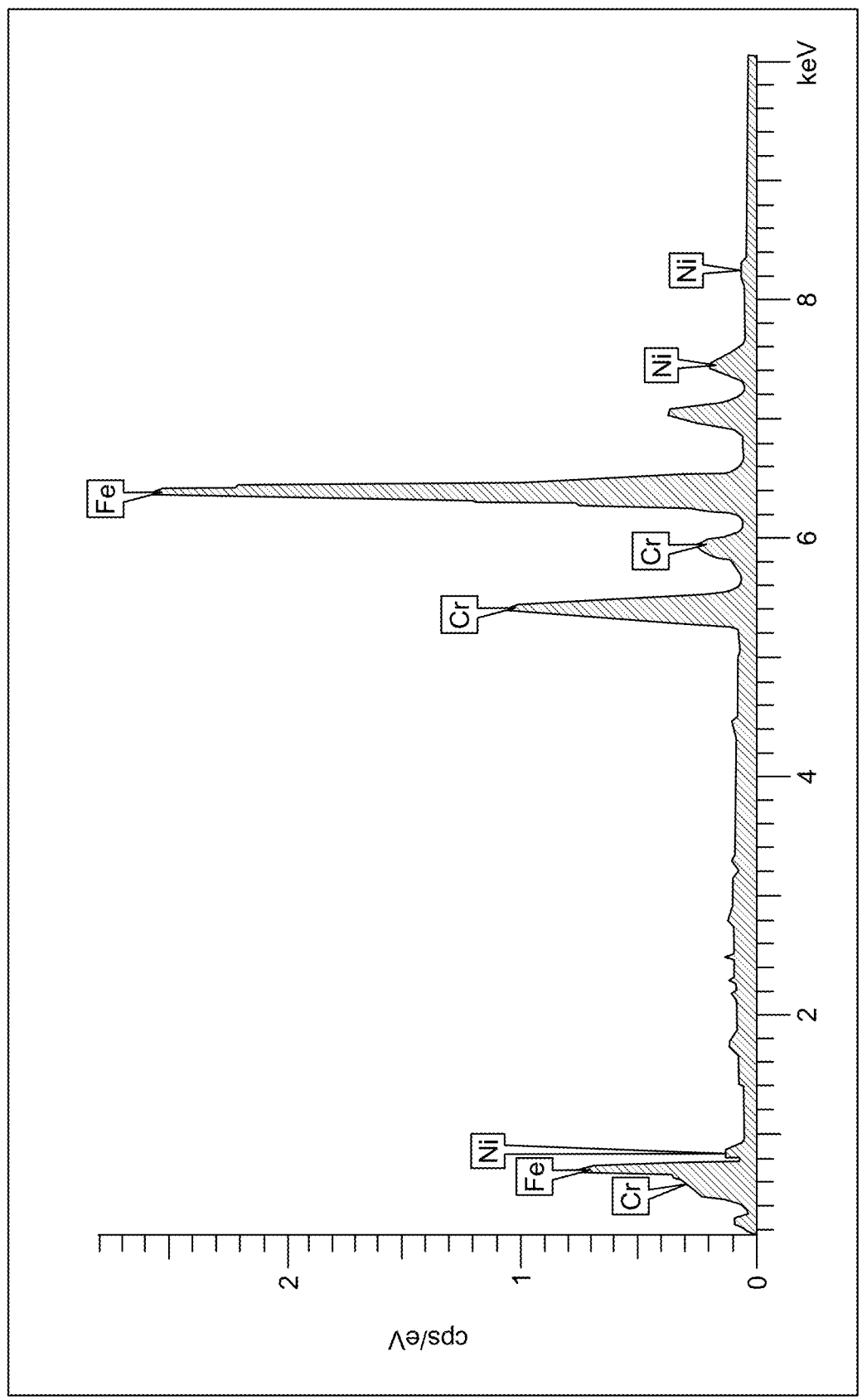
FIG. 8A depicts an energy-dispersive X-ray spectroscopy (EDS) spectrum of the SME, according to certain embodiments.
Figure 8B:
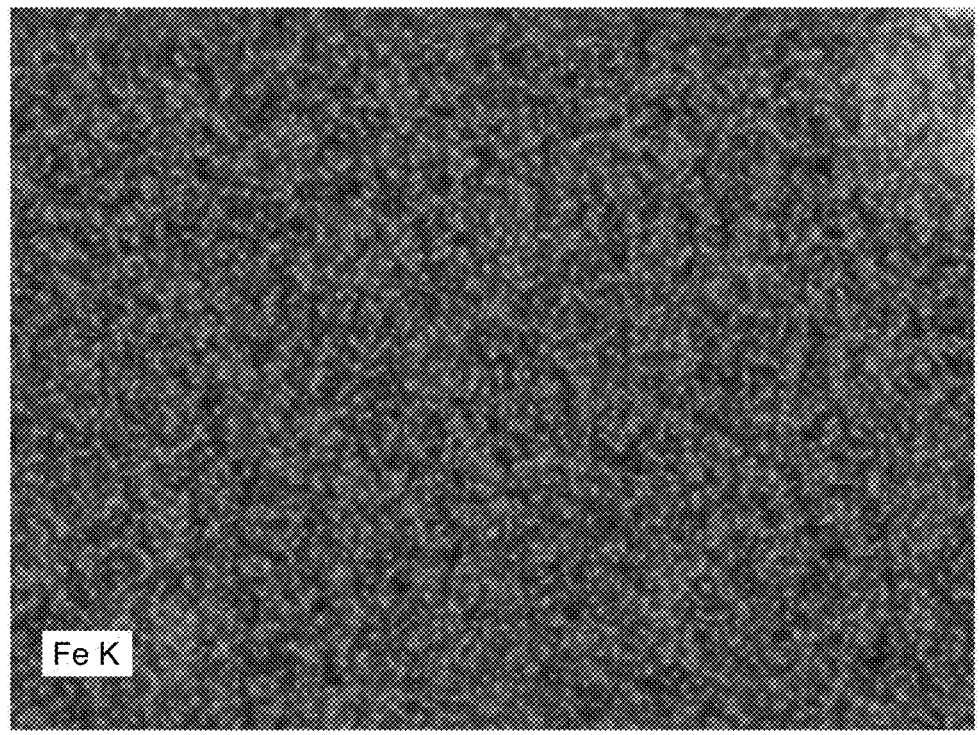
FIGS. 8B-8E depict elemental mapping of the SME, at different magnifications, according to certain embodiments.
Figure 8C:
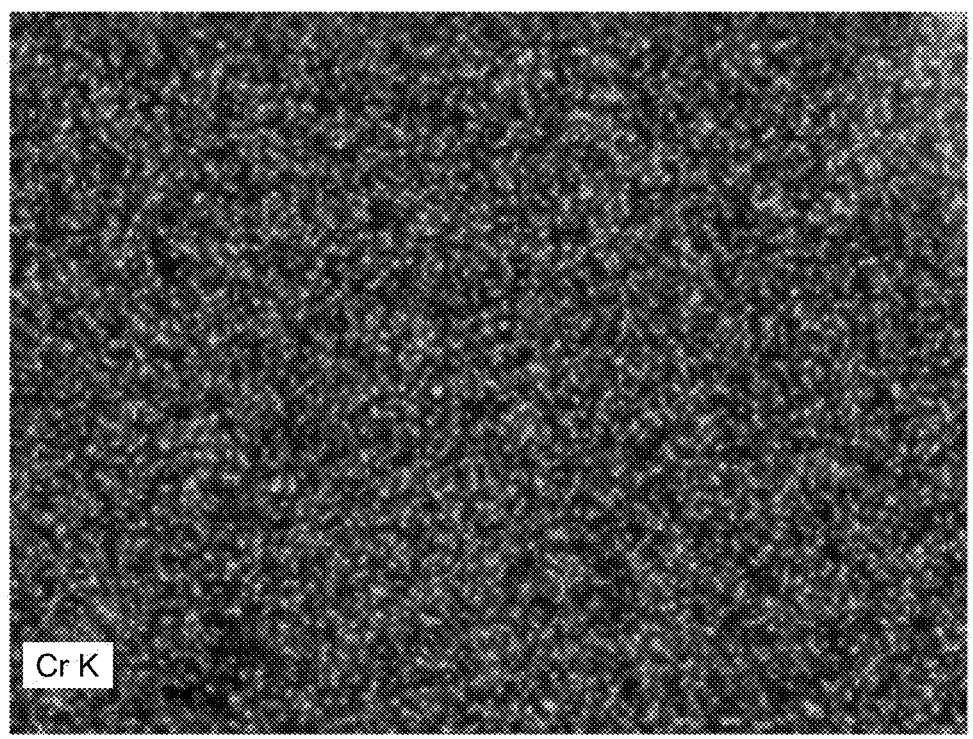
Figure 8D:
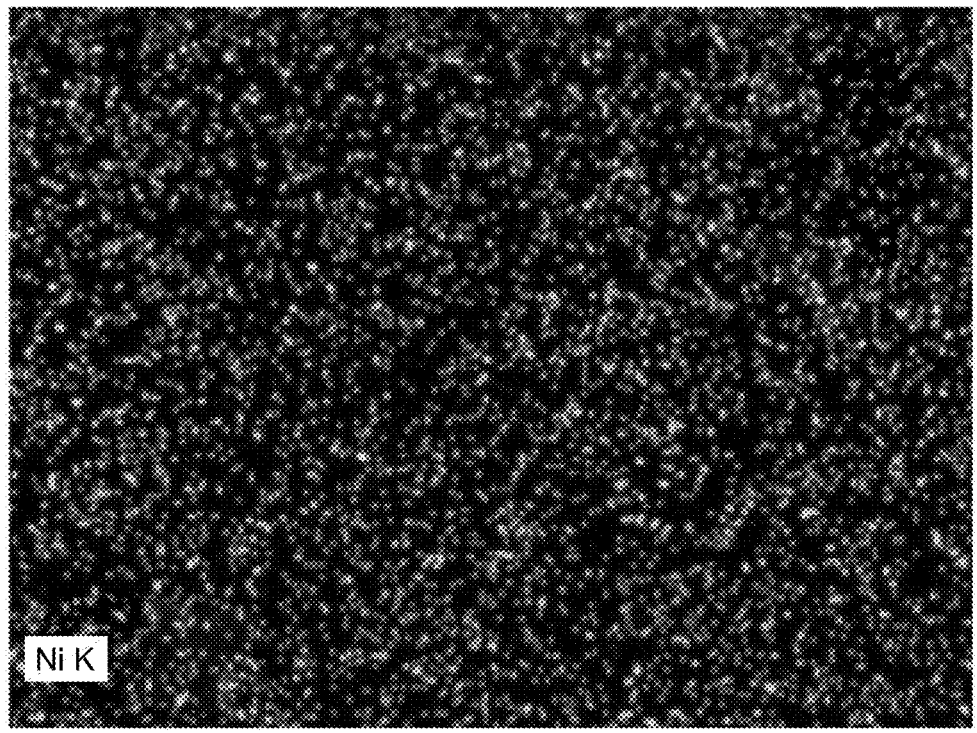
Figure 8E:
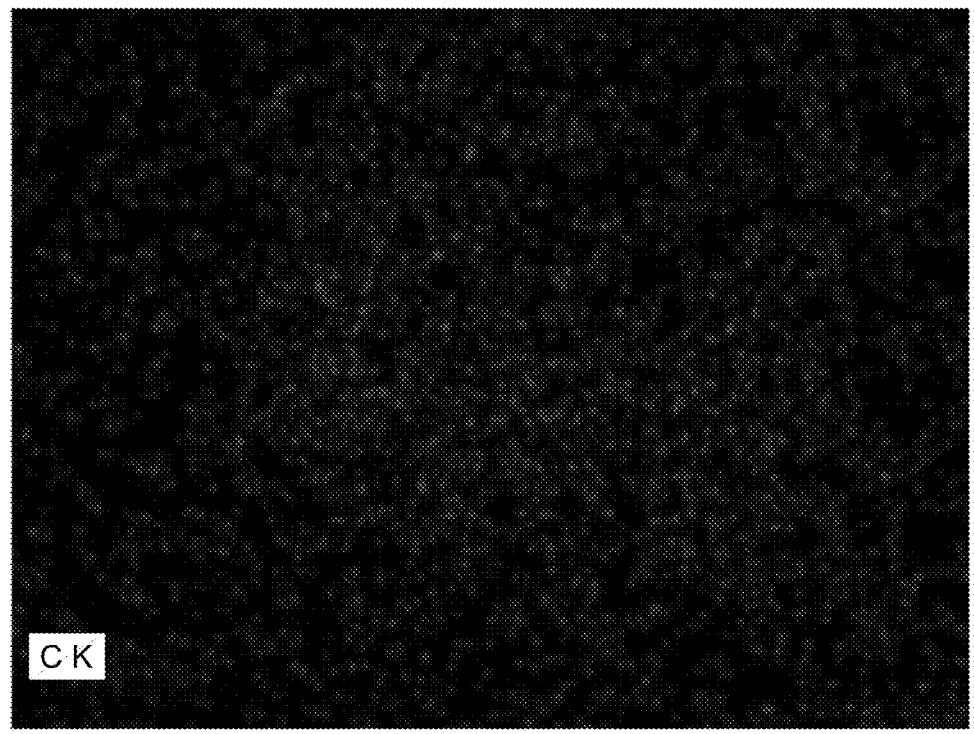

The chemical composition of the SME and PANI/SME was investigated by EDS and elemental mapping of the existing elements (FIGS. 8A-8E). EDS spectrum of the SME shows the existence of iron (Fe), chromium (Cr), nickel (Ni), and carbon (C) (FIG. 8A). Elemental mapping images display a high-density distribution of Fe as it is the main component in stainless steel (FIG. 8B). Similarly, the elemental mapping images show a high-density distribution of Cr as it is used in a high percentage in stainless-steel alloys to increase their corrosion resistance (FIG. 8C). However, the elemental mapping images show a lower density distribution of Ni and C (FIGS. 8D-8E).

Figure 9A:
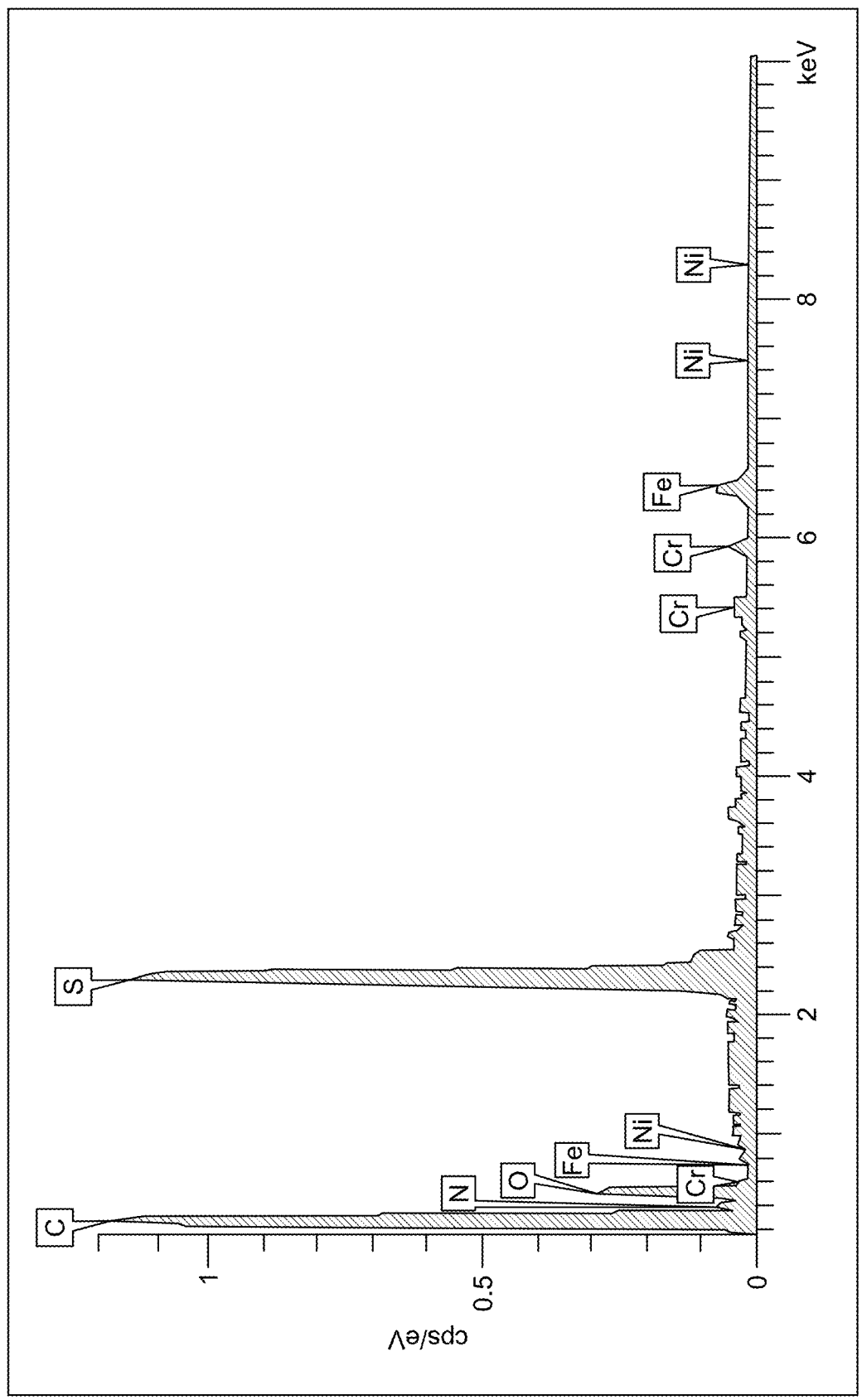
FIG. 9A depicts an energy-dispersive X-ray spectroscopy (EDS) spectrum of the PANI/SME electrode, according to certain embodiments.
Figure 9B:
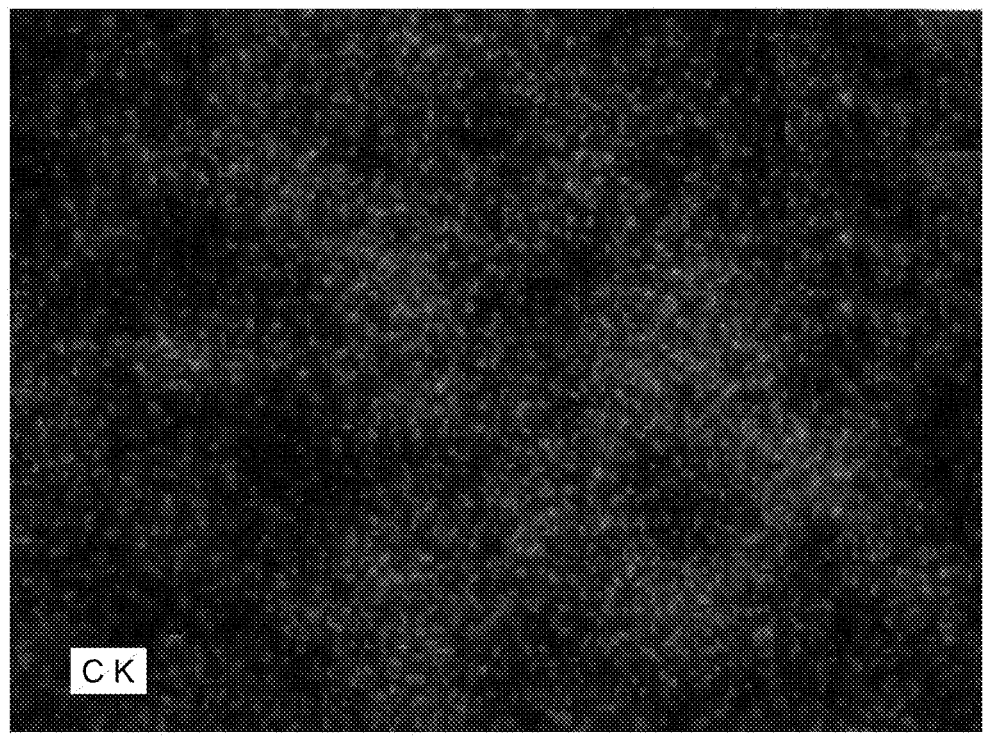
FIGS. 9B-9H depict elemental mapping of the PANI/SME electrode, according to certain embodiments.
Figure 9C:
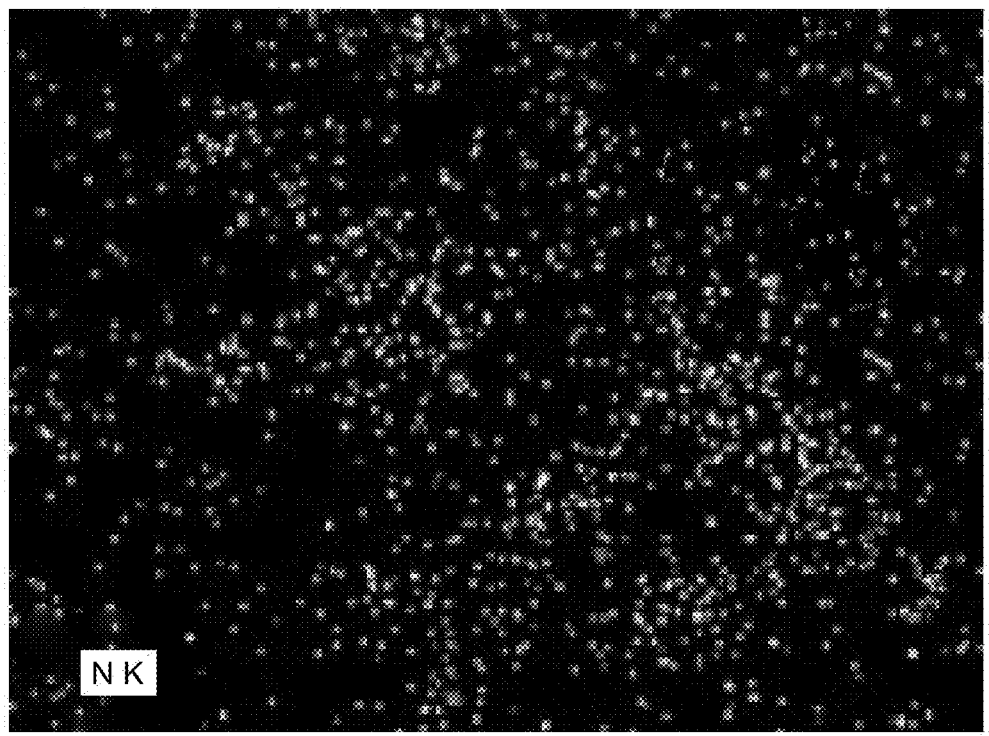
Figure 9D:
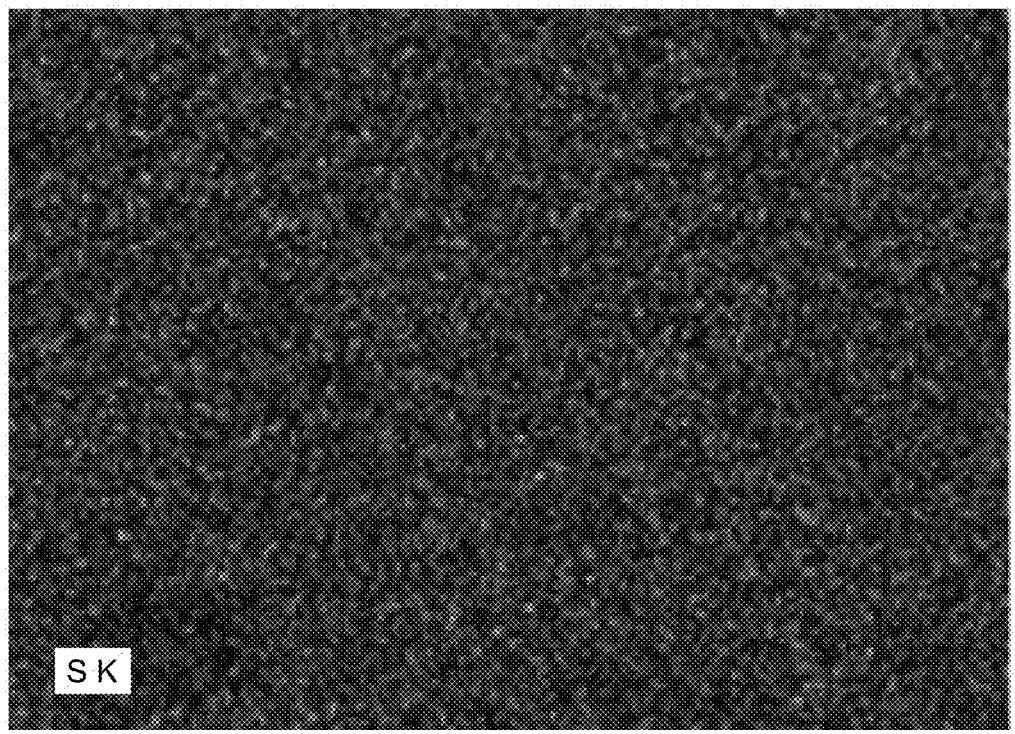
Figure 9E:
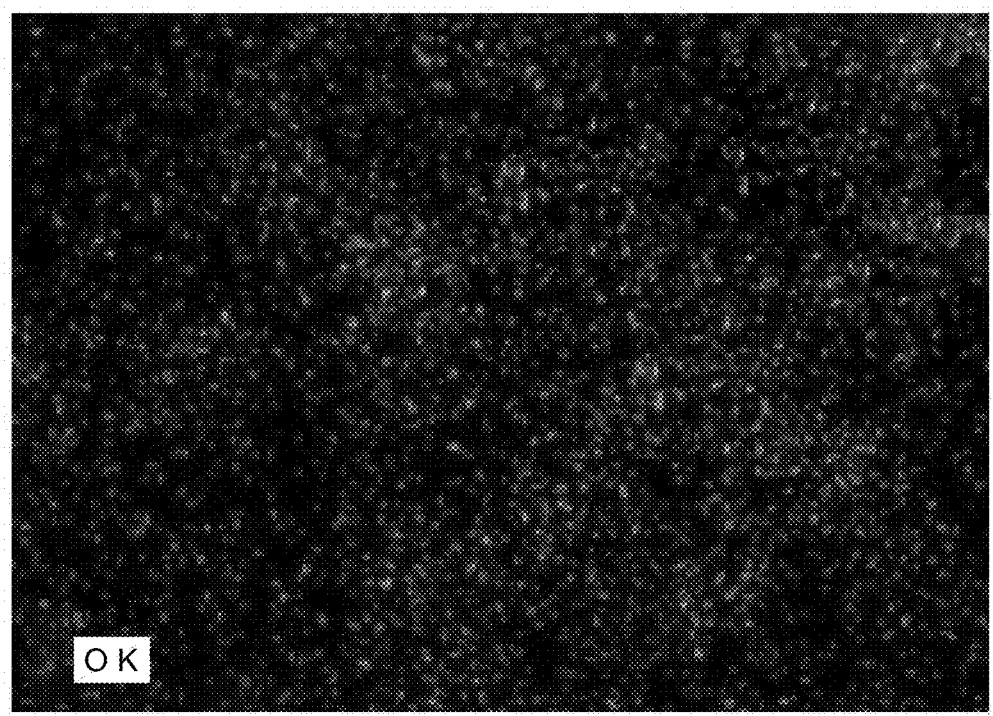
Figure 9F:
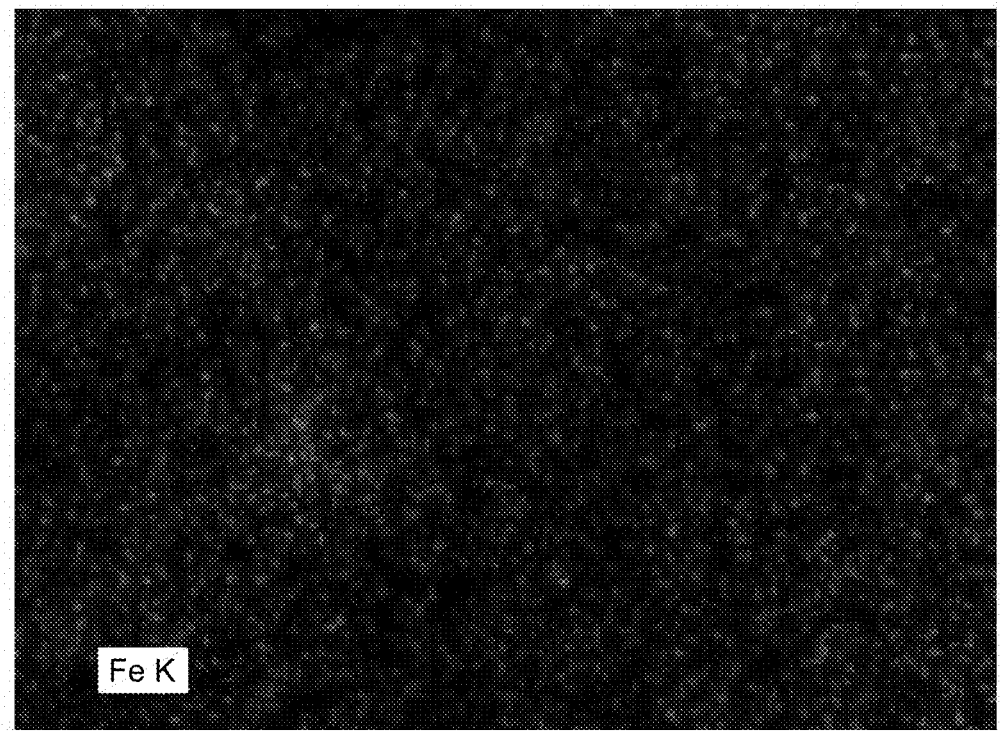
Figure 9G:
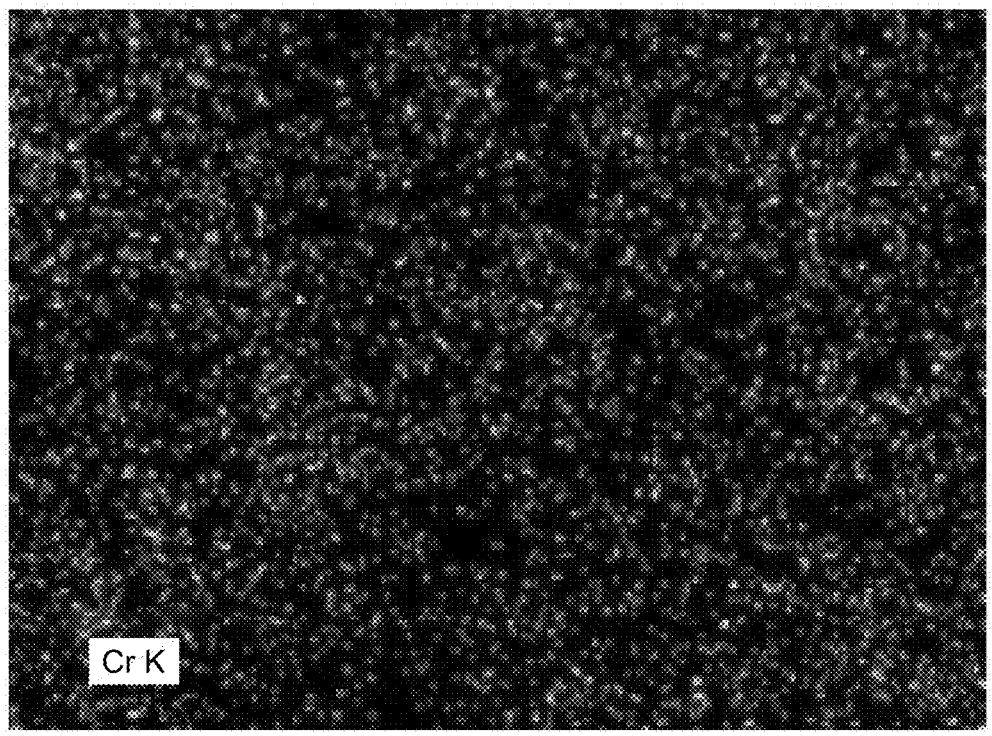
Figure 9H:
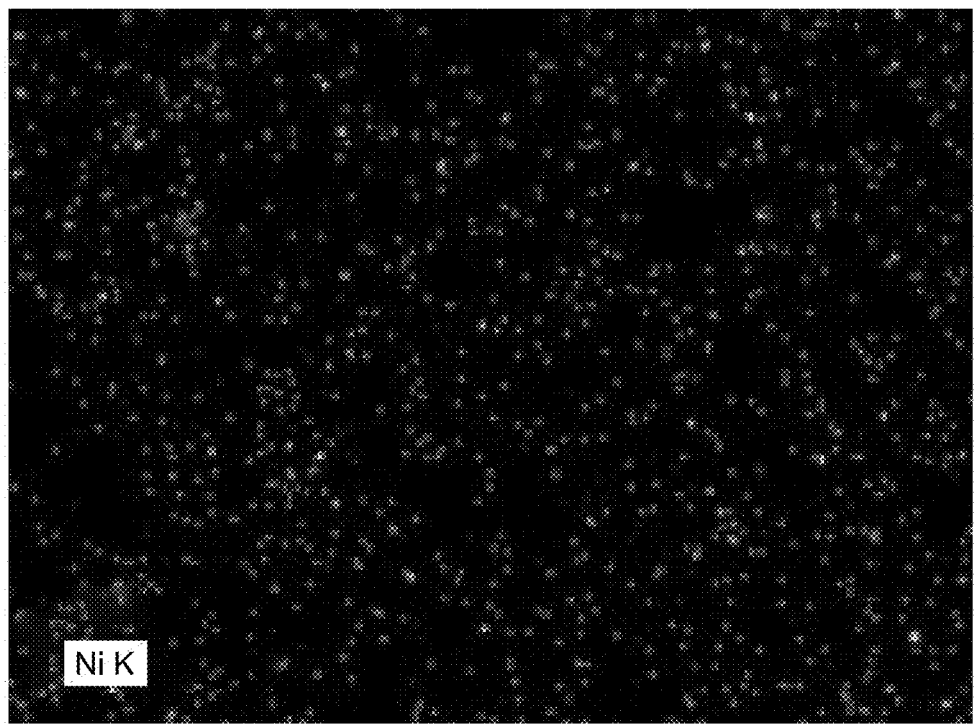

EDS spectrum of PANI/SME shows the existence of sulfur(S), oxygen (O), C, N, Fe, Cr, and Ni (FIG. 9A). The existence of C and N is due to the PANI covering of the SME (FIGS. 9B-9C). The existence of S and O is attributed to sulfate doping in PANI (FIGS. 9D-9E). Furthermore, spectra and elemental mapping images show the existence of Fe, Cr, Ni, and part of C belonging to the stainless-steel alloy, as shown in FIGS. 9F-9H.

Figure 10A:
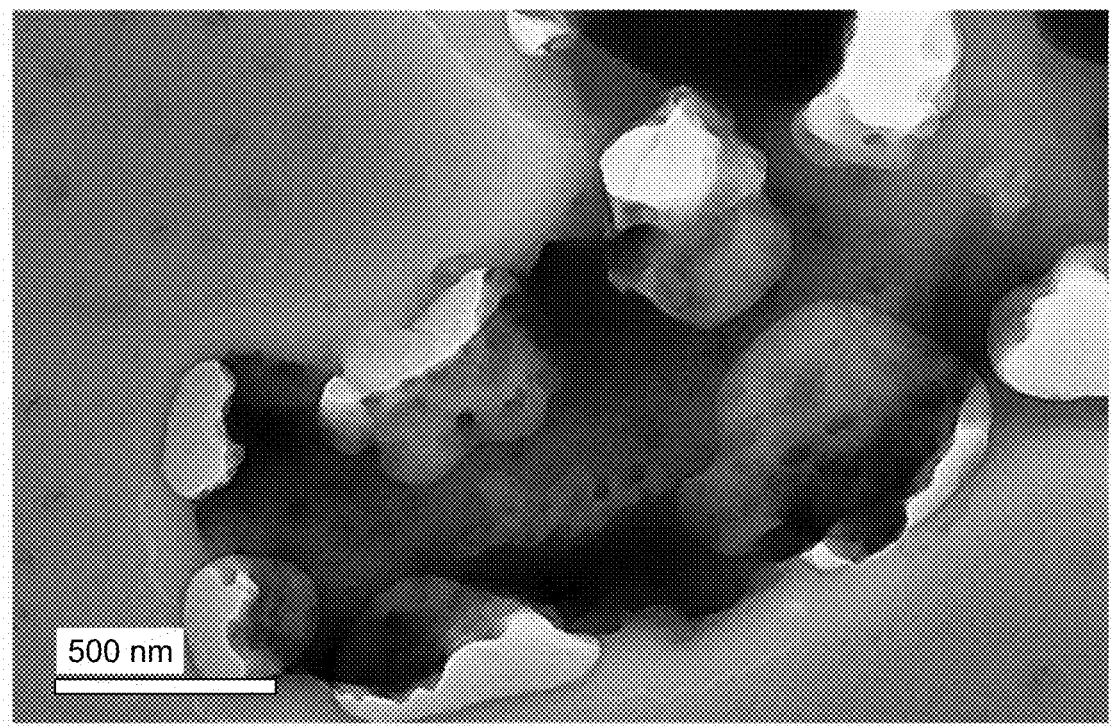
FIGS. 10A-10B depict transmission electron microscopy (TEM) images of the synthesized PANI on the SME in the solution of mono-aniline (0.5 M) in sulfuric acid (1 M) by using the CV technique at 50 mV/s in a potential widow from 0 to 1 V (vs. Ag/AgCl) for 15 cycles in a three-electrode system, according to certain embodiments.
Figure 10B:
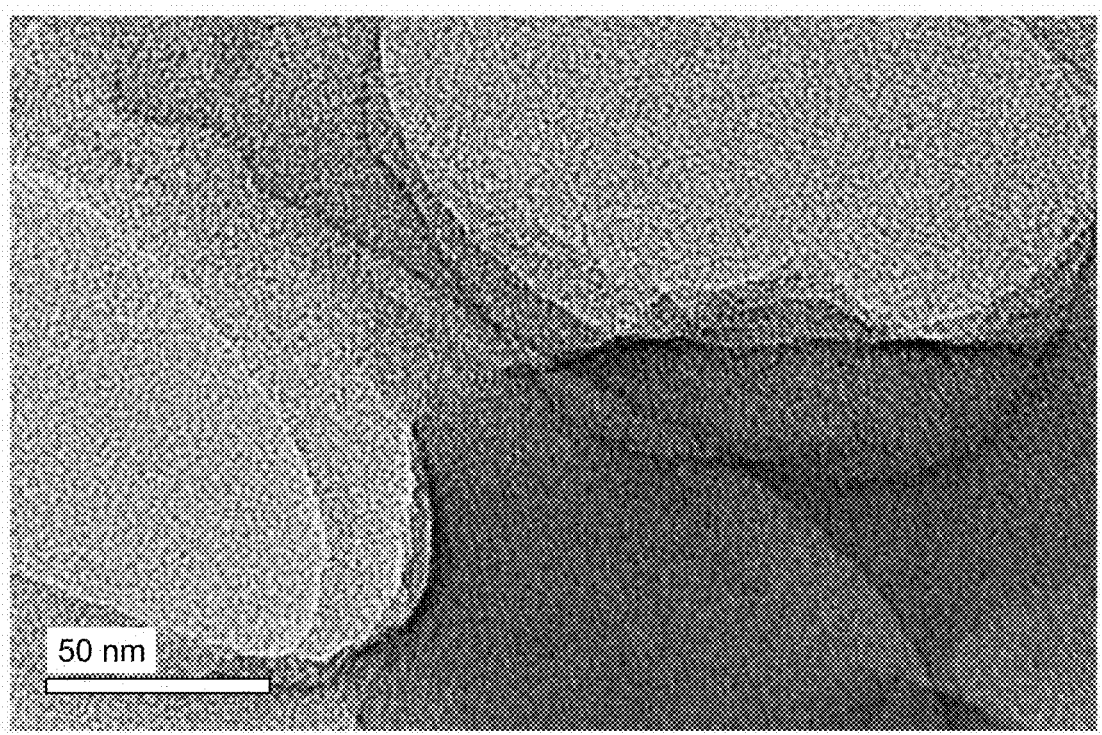
Figure 10C:
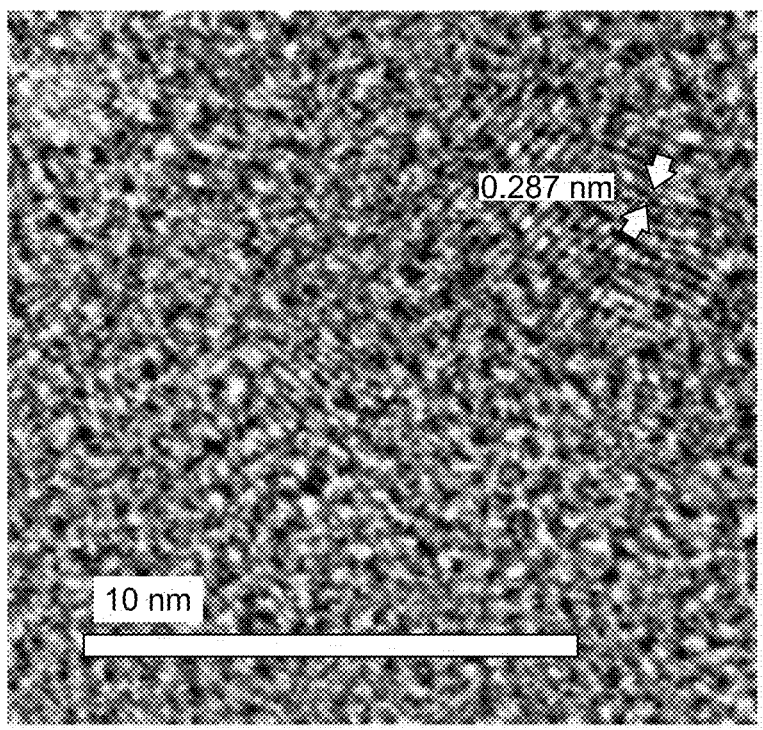
FIG. 10C depicts a high-resolution transmission electron microscopy (HRTEM) image of the synthesized PANI on the SME in the solution of mono-aniline (0.5 M) in sulfuric acid (1 M) by using the CV technique at 50 mV/s in a potential widow from 0 to 1 V (vs. Ag/AgCl) for 15 cycles in a three-electrode system, according to certain embodiments.
Figure 10D:
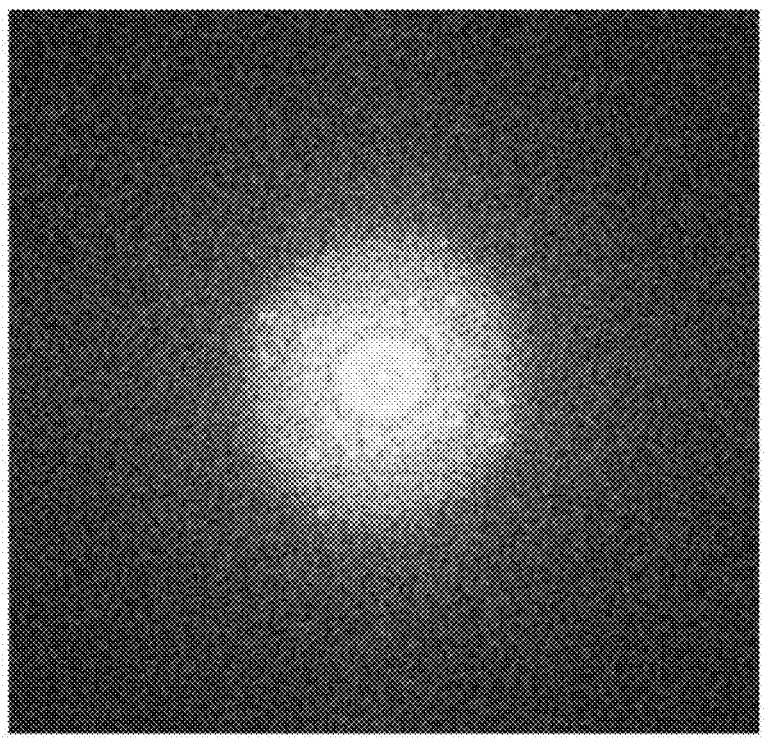
FIG. 10D depicts a selected area electron diffraction (SAED) image of the synthesized PANI on the SME in the solution of mono-aniline (0.5 M) in sulfuric acid (1 M) by using the CV technique at 50 mV/s in a potential widow from 0 to 1 V (vs. Ag/AgCl) for 15 cycles in a three-electrode system, according to certain embodiments.

TEM images of the synthesized PANI on SME are shown in FIGS. 10A-10D. FIG. 10A illustrates the porous nature of the PANI. An oval sheet-type layer structure is observed in the magnified image of FIG. 10B. In addition, high-resolution TEM (HR-TEM) images confirm the existence of both structures of amorphous and crystalline PANI (FIG. 10C). The lattice spacing was determined in the lattice structure area (observed in FIG. 10C) to be 0.287 nm associated with (020) crystal plane, which agrees with the finding of XRD analysis. Furthermore, the selected area electron diffraction (SAED) pattern confirmed the existence of a crystal structure in the synthesized PANI on the steel (FIG. 10D).

Example 8: Performance Evaluation of PANI/SME-Based Symmetric Supercapacitor

Figure 11A:
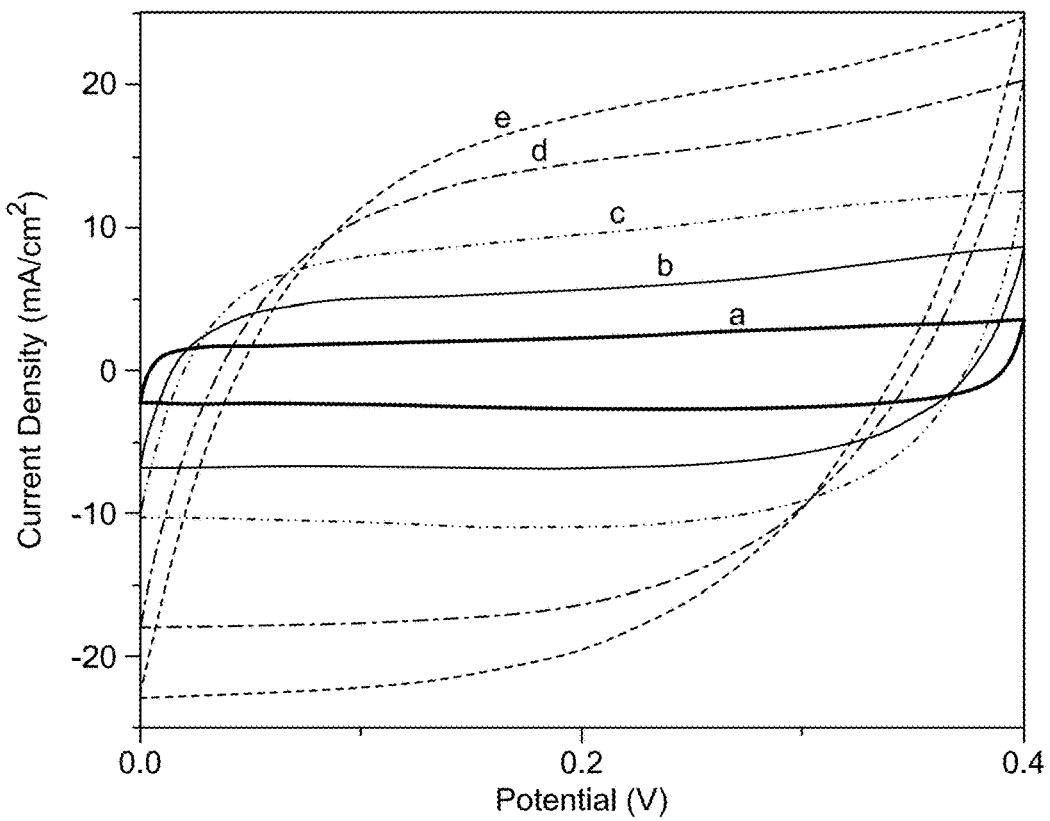
FIG. 11A depicts CV curves of PANI/SME-based symmetric supercapacitor devices measured at potential range from 0 to 0.4 V at different scan rates of 10 (a), 25 (b), 50 (c), 75 (d), and 100 mV/s (e) in 0.1 M sulfuric acid, according to certain embodiments.

To elucidate the electrochemical behavior of the PANI/SME electrodes in a symmetric supercapacitor, CV, GCD, and EIS measurements were recorded using the two-electrode system in two different OPWs of 0-0.4 V and 0-0.8 V. The two OPWs were selected to investigate the performance and mechanism of the fabricated supercapacitor in the different selected OPWs. Firstly, the symmetric supercapacitor with PANI/SME electrodes was tested by CV at different scan rates, i.e., 10, 25, 50, 75, and 100 mV/s within an applied OPW from 0 to 0.4 V (FIG. 11A). It is noticeable that the current density and the area under the CV curves increase due to the rise in scan rate. The CV curve has a quasi-rectangular shape. The shape of the figure indicates a dominant double-layer mechanism along with a limited pseudo-capacitance behavior. $C_{ar}$ was calculated for the CV curves using equation (1).

Figure 11B:
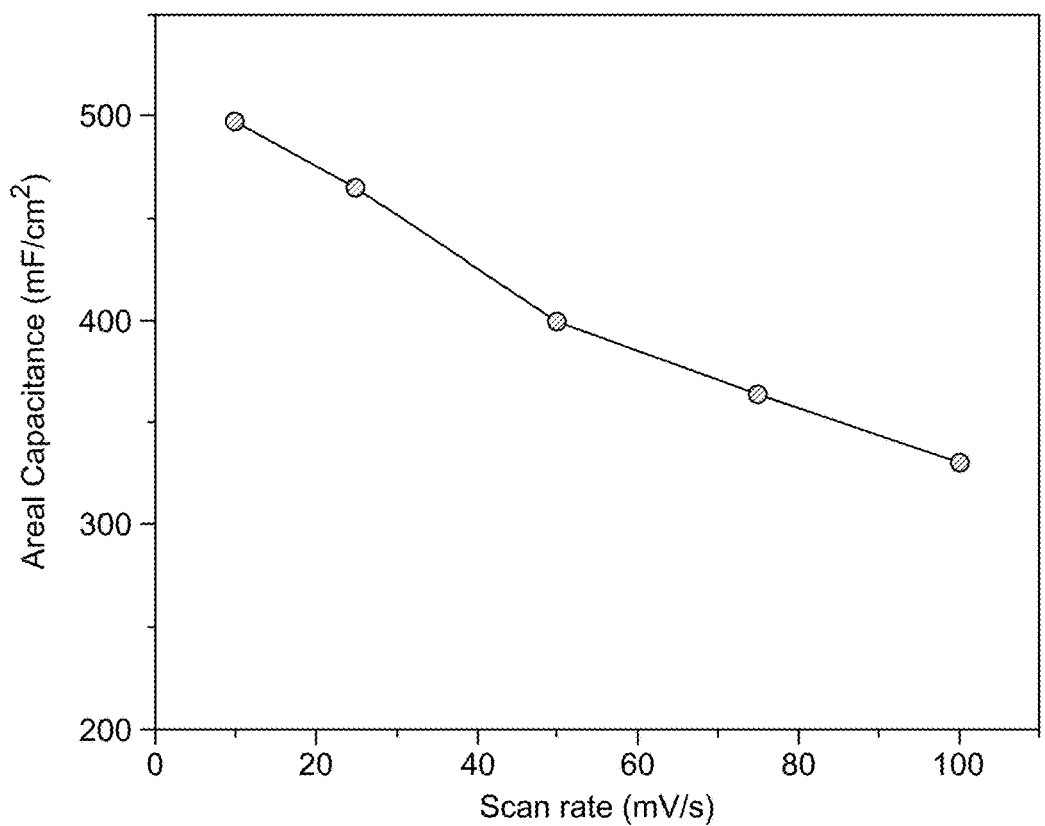
FIG. 11B depicts an areal capacitance of the PANI/SME-based symmetric supercapacitor device measured at different scan rates at the same operating potential window (OPW) from 0 to 0.4 V, according to certain embodiments.

According to (FIG. 11B), $C_{ar}$ increases by decreasing the scan rate due to the high percentage of penetration of electrolyte ions in the electrode material at a low scan rate value. The lower scan rate provides more time to increase the number of electrolyte ions that diffuse electrode materials. Conversely, a high scan rate value provides a shorter time for the diffusion of electrolyte ions into electrode materials.

Figure 11C:
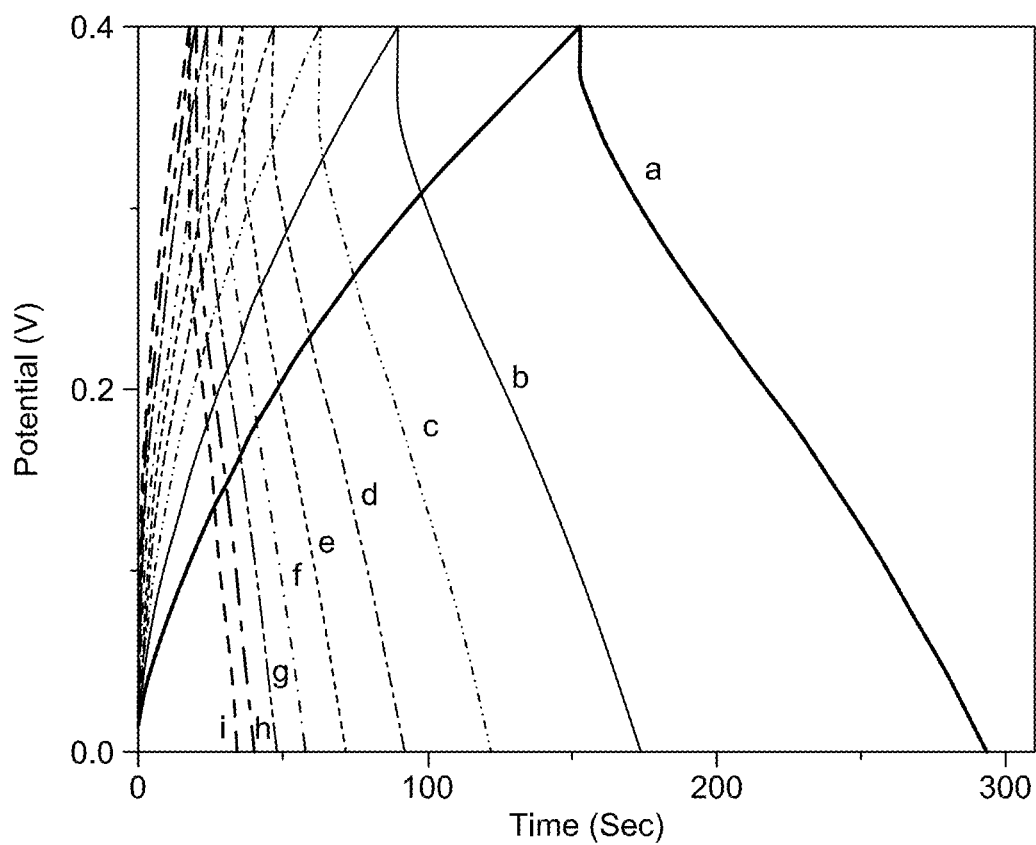
FIG. 11C depicts galvanostatic charge/discharge (GCDs) of the PANI/SME-based symmetric supercapacitor device measured at potential range from 0 to 0.4 V at different current densities of 1 (a), 1.5 (b), 2 (c), 2.5 (d), 3 (e), 3.5 (f), 4 (g), 4.5 (h), and 5 mA cm$^{-2}$ (i) in 0.1 M sulfuric acid for demonstration of the charging/discharging behavior, according to certain embodiments.

The PANI/SME electrodes-based symmetric supercapacitor was also tested over various current densities using GCD techniques. The GCD profiles were measured over 1, 1.5, 2, 2.5, 3, 3.5, 4, 4.5, and 5 mA cm$^{-2}$ using OPWs from 0 to 0.4 V (FIG. 11C). Discharging time of the supercapacitor reduces with the rise of current density. This shows a typical supercapacitor behavior. The nearly equilateral triangle shape of the GCD profiles reflects the dominant double-layer behavior over the pseudo-capacitance. $C_{ar}$ of the supercapacitor in the potential window from 0 to 0.4 V was calculated using equation (2).

At a current density of 1 mA cm$^{-2}$, the $C_{ar}$ was ~353 mF cm$^{-2}$. The value of $C_{ar}$ drops with the surge in current density. $C_{ar}$ was calculated over the rest of the current densities of 1.5, 2, 2.5, 3, 3.5, 4, 4.5, and 5 mA cm$^{-2}$, giving the $C_{ar}$ values of 315, 300, 276, 264, 254, 240, 217, and 210 mF cm$^{-2}$, respectively. The distractions can explain the decrease in the $C_{ar}$ value towards electrolyte ions infiltrating into the electrode materials and their pores due to increased current.

Figure 12A:
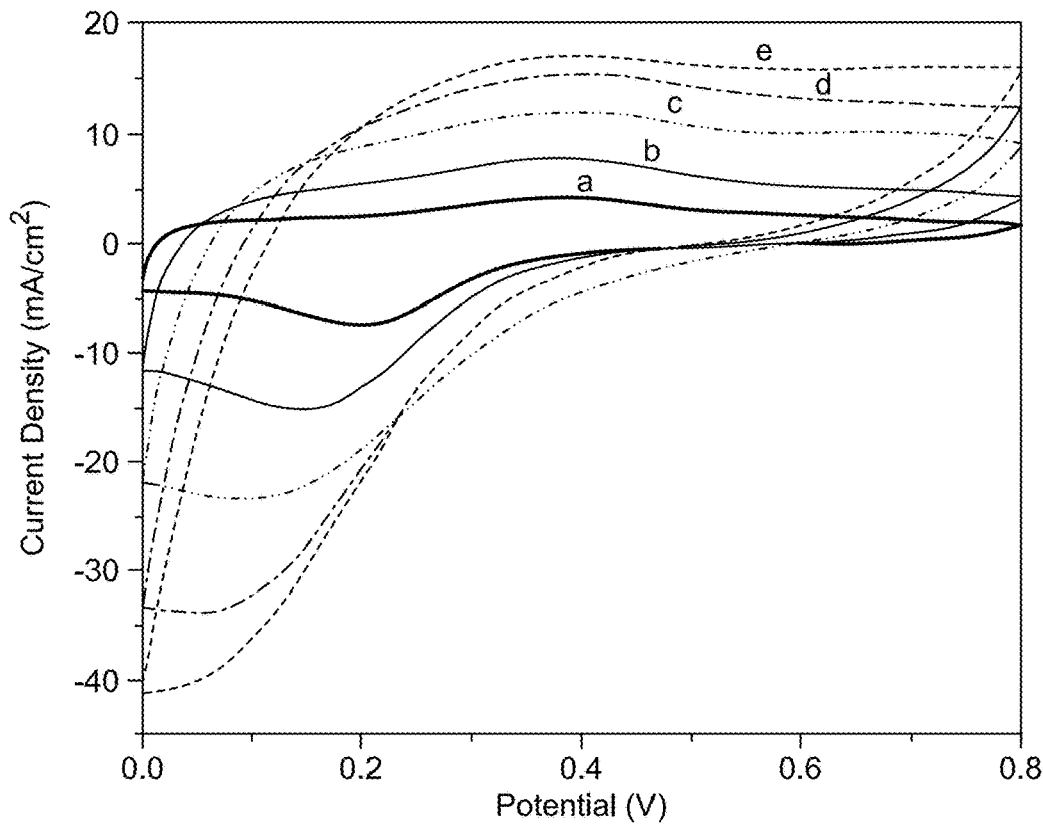
FIG. 12A depicts CVs of the PANI/SME-based symmetric supercapacitor device measured at a potential range from 0 to 0.8 V at different scan rates of 10 (a), 25 (b), 50 (c), 75 (d), and 100 mV/s (e) in 0.1 M sulfuric acid, according to certain embodiments.
Figure 12B:
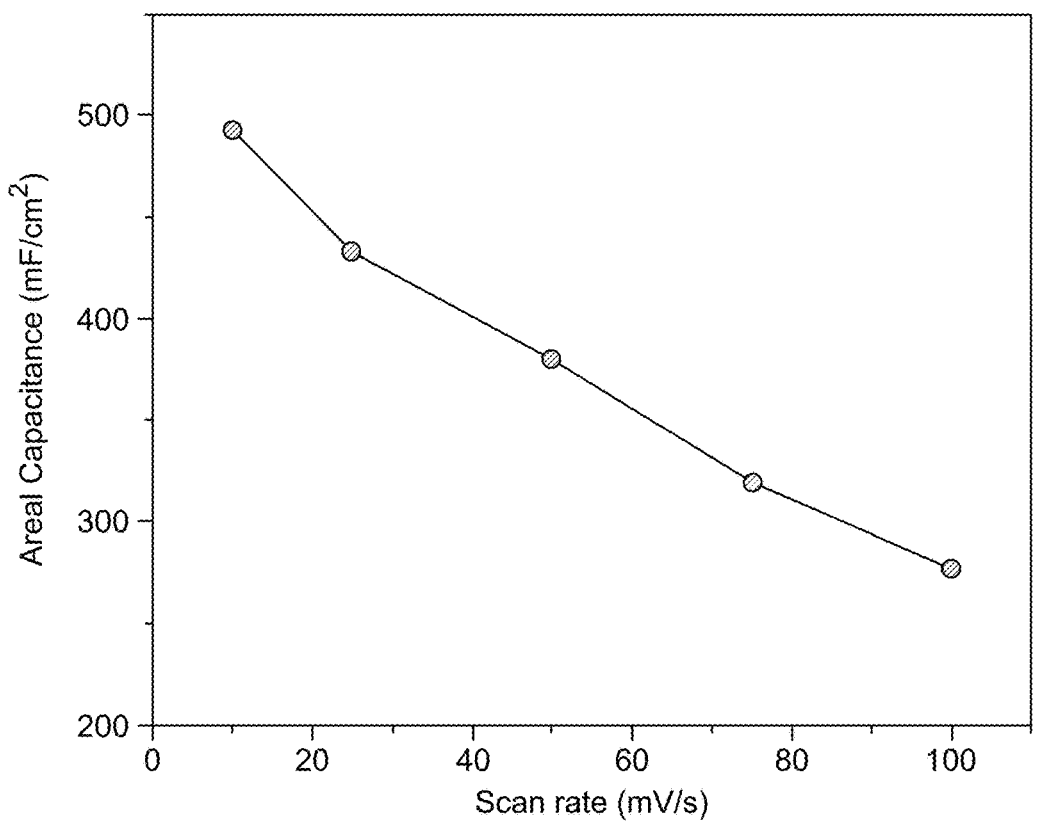
FIG. 12B depicts the areal capacitance of the PANI/SME-based symmetric supercapacitor device measured at different scan rates using the potential window from 0 to 0.8 V, according to certain embodiments.
Figure 12C:
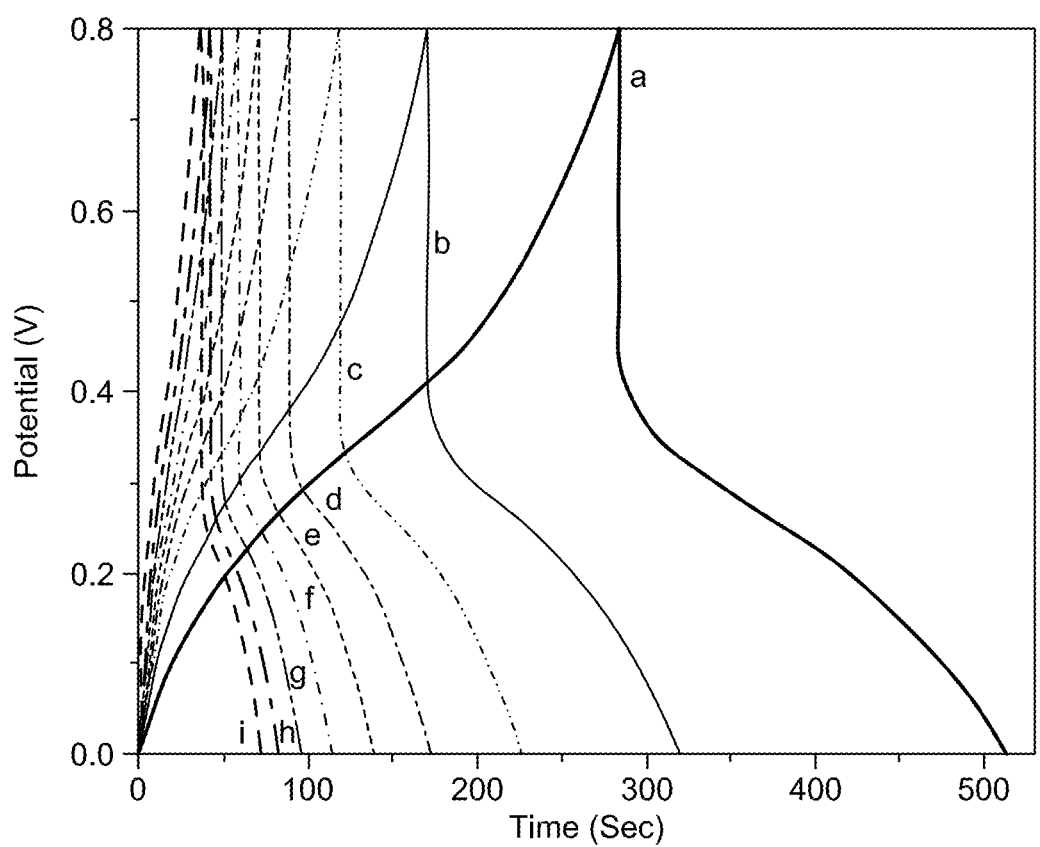
FIG. 12C depicts GCDs of the PANI/SME-based symmetric supercapacitor device measured at the potential window from 0 to 0.8 V at different current densities of 1 (a), 1.5 (b), 2 (c), 2.5 (d), 3 (e), 3.5 (f), 4 (g), 4.5 (h), and 5 mA cm$^{-2}$ (i) in 0.1 M sulfuric acid for demonstration of the charging/discharging behavior, according to certain embodiments.

The PANI/SME electrodes-based symmetric supercapacitor performance was investigated using the CV techniques with OPW from 0 to 0.8 V (FIG. 12A). Different scan rates, including 10, 25, 50, 75, and 100 mV/s, were tested (FIG. 12A). $C_{ar}$ increases by decreasing the scan rate, which reflects a standard supercapacitor behavior (FIG. 12B). According to the cyclic voltammogram shape, the supercapacitor shows a pseudo-capacitance behavior due to the redox reaction of the PANI. The figures display an oxidation peak of around 0.3 V and a reversible reduction peak of about 0.1 V. The oxidation peak is attributed to the oxidation of LM into EMB. In contrast, the reduction peak is due to the reduction of EMB into LM. GCD measurements were done over different current densities of 1, 1.5, 2, 2.5, 3, 3.5, 4, 4.5, and 5 mA cm$^{-2}$ using OPWs from 0 to 0.8 V (FIG. 12C). Using equation (2), the $C_{ar}$ was calculated to be ~297 mF cm$^{-2}$ at a current density of 1 mA cm$^{-2}$. Whereas $C_{ar}$ of the supercapacitor for the current densities of 1.5, 2, 2.5, 3, 3.5, 4, 4.5, and 5 mA cm$^{-2}$ was 279, 267, 256, 255, 241, 235, 225, and 213 mF cm$^{-2}$, respectively.

Figure 13A:
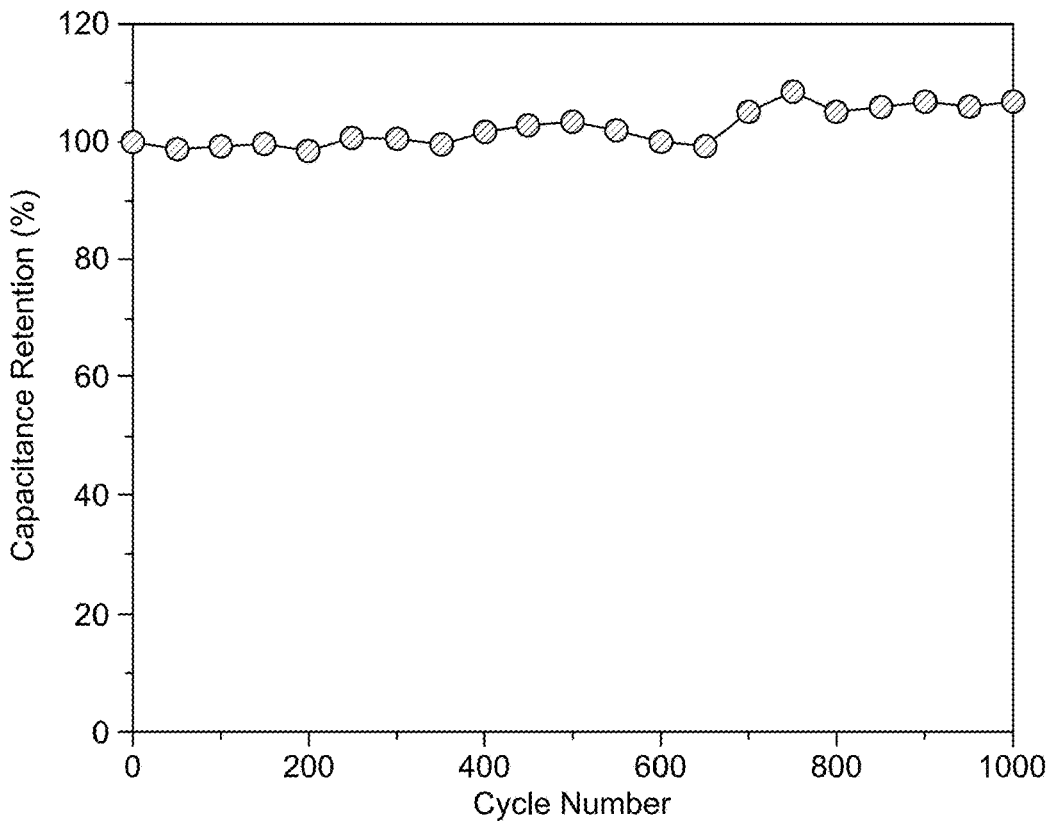
FIG. 13A depicts capacitance retention of the PANI/SME-based symmetric supercapacitor device measured at OPWs from 0 to 0.4 V at a current density of 10 mA cm$^{-2}$ after 1000 GCD cycles, according to certain embodiments.
Figure 13B:
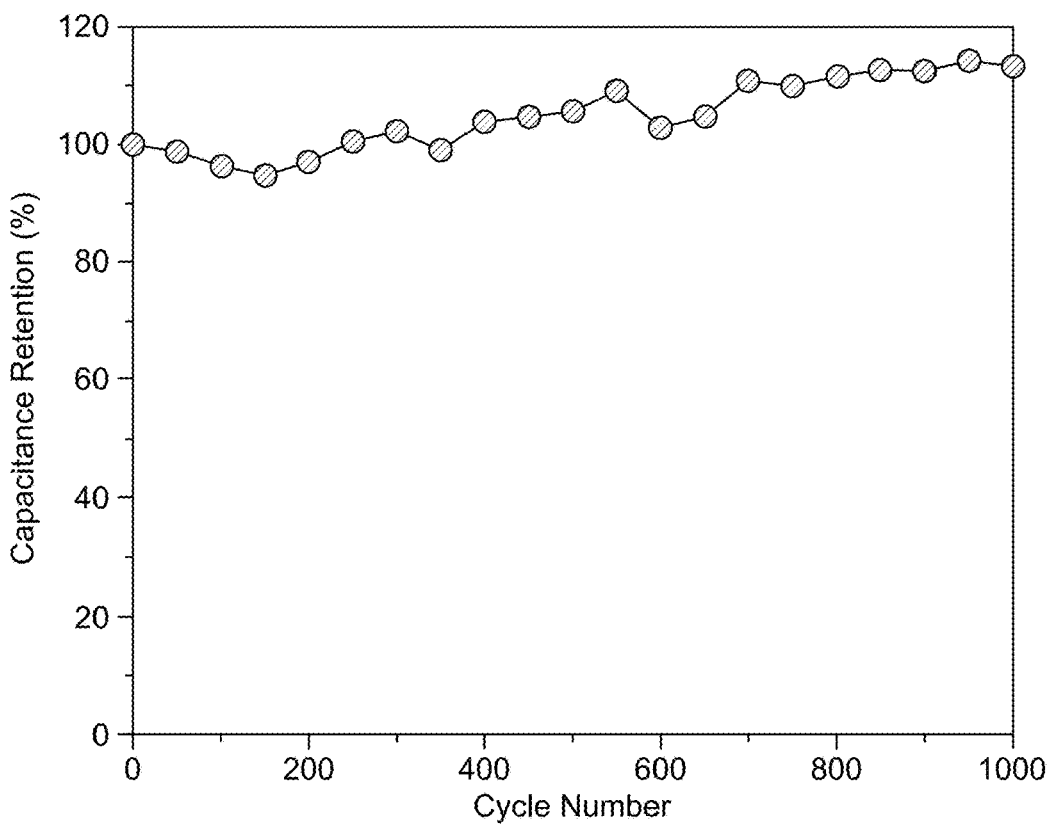
FIG. 13B depicts capacitance retention of the PANI/SME-based symmetric supercapacitor device measured at OPWs from 0 to 0.8 V at the current density of 10 mA cm$^{-2}$ after 1000 GCD cycles, according to certain embodiments.
Figure 13C:
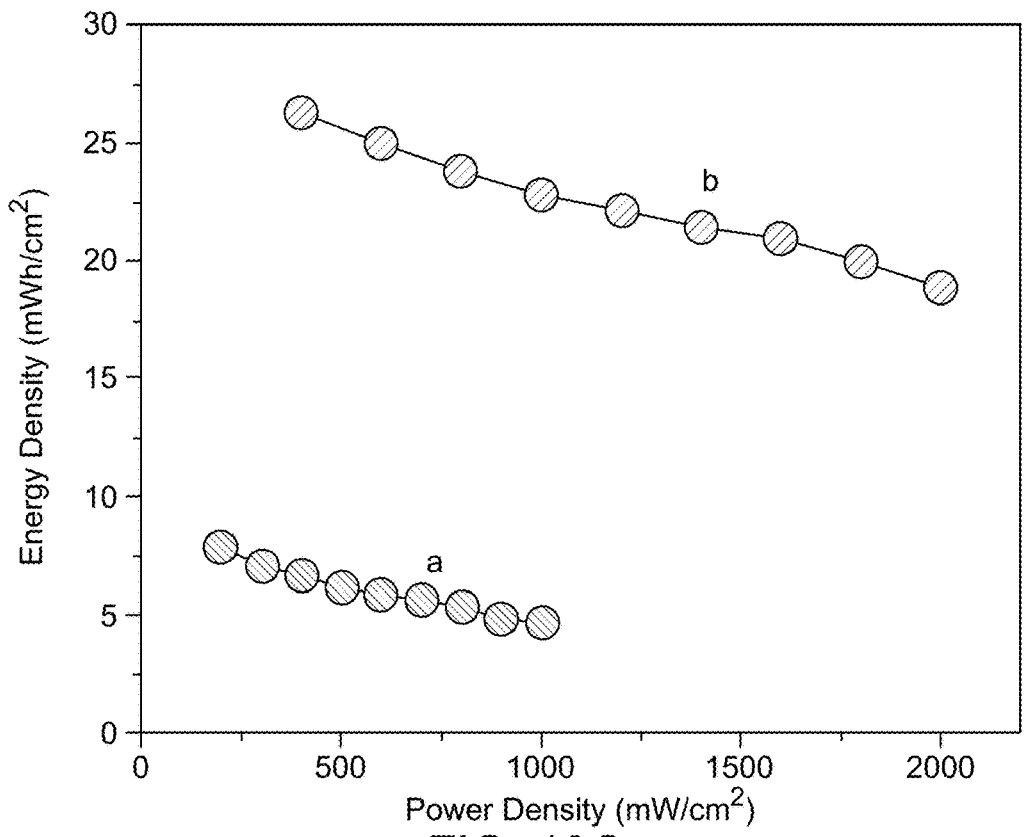
FIG. 13C depicts a Ragone plot of the PANI/SME-based symmetric supercapacitor device measured at different current densities at different OPWs from 0 to 0.4 V (a), and 0 to 0.8 V (b), according to certain embodiments.

The cyclic stability test of the PANI/SME electrodes-based symmetric supercapacitor was measured for 1000 GCD cycles. For OPWs from 0 to 0.4 V, the stability test was recorded at a current density of 10 mA cm$^{-2}$ (FIG. 13A), which does not illustrate any significant decrease in the value of $C_{ar}$ of the supercapacitor after 1000 GCD cycles. The stability test was recorded at a current density of 10 mA cm$^{-2}$ too for the potential window from 0 to 0.8 V (FIG. 13B). Similarly, the figure shows no significant decrease in the value of $C_{ar}$ of the supercapacitor after 1000 GCD cycles. The energy density and power density of the PANI/SME electrodes symmetric supercapacitor were measured from the GCD data using equations (3) and (4), respectively. Energy and power densities of the supercapacitor were calculated at different current densities of 1, 1.5, 2, 2.5, 3, 3.5, 4, 4.5, and 5 mA cm$^{-2}$ using both potential windows of 0 to 0.4 V and 0 to 0.8 V (FIG. 13C). At a current density of 1 mA cm$^{-2}$ and using OPWs from 0 to 0.4 V; the PANI/SME electrodes-based symmetric supercapacitor revealed an energy density of ~7.8 µWh/cm$^2$ at a power density of ~199 µW/cm$^2$. At the same current density for OPWs from 0 to 0.8 V, the PANI/SME electrodes-based symmetric supercapacitor exhibited an energy density of ~26.4 µWh/cm$^2$ at a power density of ~400 µW/cm$^2$.

The resulting energy and power densities were used to design the Ragone plot (FIG. 13C). The Ragone plot of the PANI/SME electrodes-based symmetric supercapacitor displays a standard behavior of the supercapacitor, i.e., by increasing the power density of the device, energy density decreases. It is noticeable that the energy density values of the supercapacitor measured by using OPWs from 0 to 0.8 V are much higher than the E values in the case of using OPWs from 0 to 0.4 V in all current densities used in the measurement. In addition, the power density values for OPWs from 0 to 0.8 V are higher than those for OPWs from 0 to 0.4 V.

The PANI/SME electrodes-based symmetric supercapacitor showed a relatively higher capacitance when using OPWs from 0 to 0.4 V. On the contrary, it exhibited a higher power and energy density using OPWs from 0 to 0.8 V (Table 2).

TABLE 2

Performance comparison of the PANI/SME-based symmetric supercapacitor using different OPWs of 0 to 0.4 V and 0 to 0.8 V.

| OPW (V) | Current density [mA cm$^{-2}$] | Areal capacitance [mF cm$^{-2}$] | Energy density [µWh/cm$^2$] | Power density [µW/cm$^2$] |
|---|---|---|---|---|
| 0-0.4 | 1 | ~353 | ~7.8 | ~199 |
| 0-0.8 | 1 | ~297 | ~26.4 | ~400 |

Figure 13D:
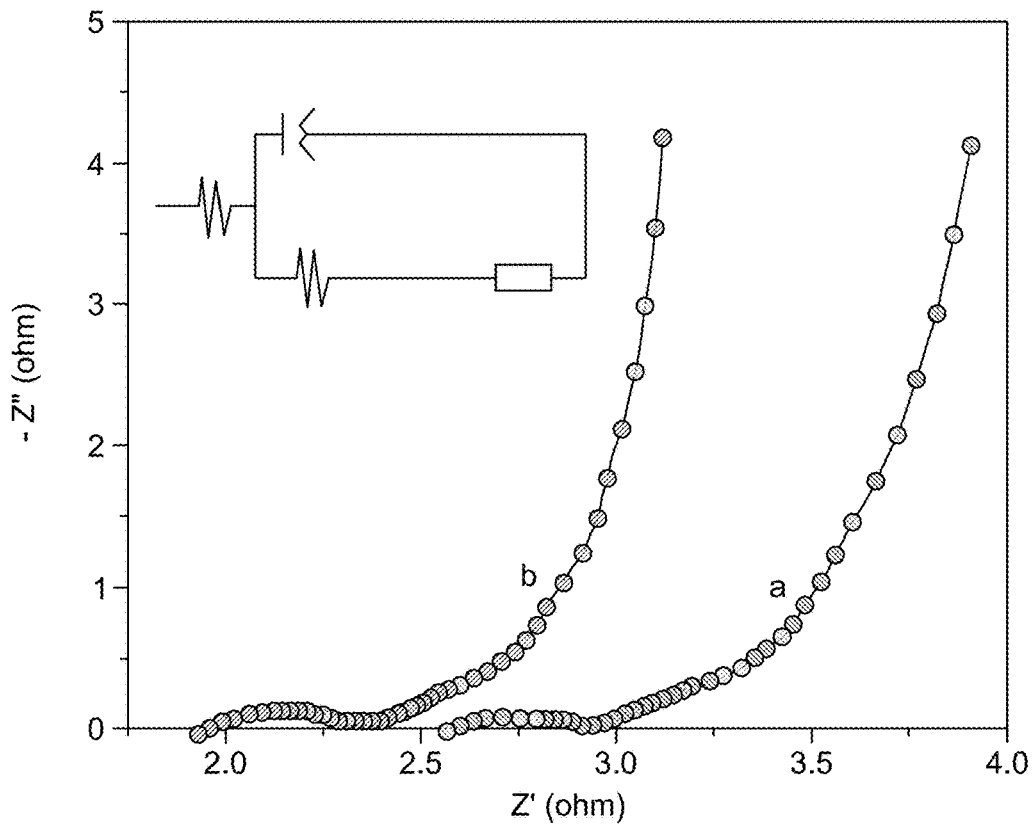
FIG. 13D depicts an equivalent circuit diagram and a Nyquist plot showing before (a), and after (b), the stability test of 1000 cycles with OPWs 0-0.8 V, according to certain embodiments.

This study indicates that OPWs of the fabricated symmetric supercapacitor could be chosen per the practical demand of the specific capacitance, energy, and power density. The Nyquist plots of the PANI/SME electrodes-based symmetric supercapacitor before and after the stability test by applying OPWs of 0 to 0.8 V are shown in FIG. 13D. The solution resistance, the equivalent series resistance (RESR) of the PANI/SME electrodes-based symmetric supercapacitor, was calculated from the Nyquist plot by measuring the intersection of curves with the X-axis. The charge transfer resistance (RCT) was calculated by calculating the diameter of the semi-circle of the Nyquist plot. The Warburg impedance (W), which presents the slope of the Nyquist plot at the low-frequency region of the plot, was calculated by the equation of its linearity. In general, the slope of the Nyquist plot shows the degree of diffusion of electrolyte ions throughout the electrode material surface.

Accordingly, a high slope of the Nyquist plot exhibits a better diffusion of ions via the electrode material surface and provides better capacitance performance. Regarding the Nyquist plots, RESR was 2.6 ohm (Ω) before and 1.9Ω after 1000 GCD cycles. At the same time, RCT was slightly changed before and after the stability test from 0.33 to 0.41Ω, respectively (FIG. 13D). This slight change is because of electrolyte ions trapping in the electrode materials. Furthermore, W was 7.6Ω before the stability test and 10.5Ω after 1000 GCD cycles. As a result, the change in RESR and RCT was slight and could be neglectable. In addition, an increase in the W value indicates the high stability of the supercapacitor even at a higher number of cycles.

Numerous modifications and variations of the present disclosure are possible in light of the above teachings. It is therefore to be understood that within the scope of the appended claims, the invention may be practiced otherwise than as specifically described herein.

The invention claimed is:
1. A method of making a supercapacitor, comprising:
   mixing aniline and an acid to form a solution;
   contacting a reference electrode, a counter electrode, and a steel substrate with the solution to form an electrodeposition system;
   applying a potential of from greater than 0 to about 2 volts (V) to the electrodeposition system;

depositing particles of polyaniline on a surface of the steel substrate to form a polyaniline electrode; and assembling two of the polyaniline electrodes in a symmetrical layered configuration with the surfaces having the particles of the polyaniline facing each other, wherein an electrolyte is present between the two polyaniline electrodes to form the supercapacitor, wherein the particles of the polyaniline have an oval sheet morphology with an average length of 100-300 nanometers (nm) and an average width of 50-150 nm.

2. The method of claim 1, wherein the applying the potential is with cyclic voltammetry and wherein an applied voltage is scanned in cycles from a potential of about 0 V to about 1 V.

3. The method of claim 2, wherein 1-20 cycles of the applying the potential with cyclic voltammetry are performed.

4. The method of claim 2, wherein 10-15 cycles of the applying the potential with cyclic voltammetry are performed.

5. The method of claim 2, wherein a scan rate of the cyclic voltammetry is 10-100 millivolts per second (mV/s).

6. The method of claim 1, wherein the particles of the polyaniline are aggregated and form a porous coral structure on the steel substrate.

7. The method of claim 6, wherein pores of the porous coral structure have an average size of 0.5-3 micrometers (μm).

8. The method of claim 1, wherein the particles of the polyaniline form an interconnected cross-sectional fibril network of the surface of the steel substrate.

9. The method of claim 1, wherein the particles of the polyaniline comprise a polyaniline material having an emeraldine salt form.

10. The method of claim 9, wherein the emeraldine salt comprises $SO_4^{2-}$.

11. The method of claim 1, wherein the particles of the polyaniline comprise a polyaniline material that is crystalline and amorphous.

12. The method of claim 1, wherein the steel substrate is a steel mesh substrate having apertures with the largest dimension of 75-200 μm and a wire width of 50-100 μm.

13. The method of claim 12, wherein the particles of the polyaniline form a layer on the surface of the steel mesh substrate, and wherein the apertures have a length of 75 to 150 μm and a width from 40 to 20 μm.

14. The method of claim 1, wherein the solution comprises the aniline in a concentration of 0.1-1 molar (M).

15. The method of claim 1, wherein the solution comprises the acid in a concentration of 0.1-5 M.

16. The method of claim 1, wherein the acid is selected from the group consisting of hydrochloric acid, nitric acid, sulfuric acid, hydrobromic acid, hydroiodic acid, and perchloric acid.

17. The method of claim 1, wherein the electrolyte is selected from the group consisting of hydrochloric acid, nitric acid, sulfuric acid, hydrobromic acid, hydroiodic acid, and perchloric acid.

18. The method of claim 1, wherein the supercapacitor has an energy density of 20-30 watt-hour per centimeter square (W h/cm$^2$) at a power density of about 400 watt per centimeter square (W/cm$^2$).

19. The method of claim 1, wherein the supercapacitor has a specific capacitance of 250-400 millifarad centimeter square (mF cm$^{-2}$) at a current density of about 1-4 milliampere per centimeter square (mA cm$^{-2}$).

* * * * *